(12) United States Patent
Nguyen et al.

(10) Patent No.: US 12,215,275 B2
(45) Date of Patent: Feb. 4, 2025

(54) COMPOSITIONS FOR ENHANCED OIL RECOVERY

(71) Applicant: ChampionX LLC, Sugar Land, TX (US)

(72) Inventors: Duy T. Nguyen, Richmond, TX (US); Tzu-Ping Hsu, Richmond, TX (US)

(*) Notice: Subject to any disclaimer, the term of this patent is extended or adjusted under 35 U.S.C. 154(b) by 236 days.

(21) Appl. No.: 17/636,086

(22) PCT Filed: Aug. 24, 2020

(86) PCT No.: PCT/US2020/047601
§ 371 (c)(1),
(2) Date: Feb. 17, 2022

(87) PCT Pub. No.: WO2021/035207
PCT Pub. Date: Feb. 25, 2021

(65) Prior Publication Data
US 2022/0298408 A1 Sep. 22, 2022

Related U.S. Application Data

(60) Provisional application No. 62/890,235, filed on Aug. 22, 2019.

(51) Int. Cl.
*C09K 8/584* (2006.01)
*E21B 43/16* (2006.01)
(52) U.S. Cl.
CPC .............. *C09K 8/584* (2013.01); *E21B 43/16* (2013.01)
(58) Field of Classification Search
None
See application file for complete search history.

(56) References Cited

U.S. PATENT DOCUMENTS 4,743,385 A   5/1988   Angstadt et al.
4,769,161 A   9/1988   Angstadt
(Continued)

FOREIGN PATENT DOCUMENTS

WO   20140137974 A1   9/2014
WO   2017044953 A1    3/2017
WO   2019028085 A1    2/2019

OTHER PUBLICATIONS

Cai et al., Molecular dynamics simulation of binary betaine and anionic surfactant mixtures at decane-Water interface, Journal of Molecular Liquids, vol. 266, No. 15, pp. 82-89 (2018).
(Continued)

*Primary Examiner* — John J Figueroa
(74) *Attorney, Agent, or Firm* — Scheef & Stone, L.L.P.; Keith C. Rawlins, Esq.

(57) ABSTRACT

Compositions and methods for increasing recovery, or flowback, of hydrocarbon compounds from hydrocarbon-containing subterranean oil formations. Concentrates include a sulfonated and/or a sulfated surfactant, an alkoxylated alcohol surfactant, a coupling agent, a hydrotrope, an additional surfactant, and water. Injectate compositions for oil recovery include the concentrate and a water source such as a produced water and/or seawater. Inclusion of particular hydrotropes such as sodium xylene sulfonate and/or potassium toluene phosphate in the compositions provides higher yields of hydrocarbons recovered. Larger amounts of hydrotrope result in an increase in injectate interfacial tension, but also result, as judged by decreased turbidity, in improved compatibility of the surfactant system in injectates made with water sources comprising salts.

20 Claims, 5 Drawing Sheets

(56) References Cited

U.S. PATENT DOCUMENTS

| | | |
|---|---|---|
| 5,958,334 A | 9/1999 | Haddon |
| 6,506,717 B1 | 1/2003 | Kott et al. |
| 2005/0282711 A1 | 12/2005 | Ubbels et al. |
| 2011/0015111 A1 | 1/2011 | Yu et al. |
| 2012/0283152 A1* | 11/2012 | Tarafdar ................ C09K 8/487 507/224 |
| 2013/0288946 A1 | 10/2013 | Allen et al. |
| 2014/0262297 A1 | 9/2014 | Huang |
| 2014/0274857 A1* | 9/2014 | Schacht .................. C11D 1/75 510/234 |
| 2015/0267104 A1 | 9/2015 | Puerto et al. |
| 2016/0244678 A1 | 8/2016 | Nguyen |
| 2016/0251568 A1 | 9/2016 | Do et al. |
| 2018/0105732 A1 | 4/2018 | Okocha et al. |
| 2018/0303090 A1 | 10/2018 | Budhian et al. |

OTHER PUBLICATIONS

Tan et al., Performance Evaluation and Application of the Surfactant Combinations showing Ultra-low Oil-Water Interfacial Tensions, Tenside Surfactants Detergents, vol. 55, No. 1, pp. 65-70 (2018).
International Search Report for International Application No. PCT/US2020/047601, mailed on Nov. 5, 2020, 6 pages.
Written Opinion for International Application No. PCT/US2020/047601, mailed on Nov. 5, 2020, 10 pages.

* cited by examiner

COMPOSITIONS FOR ENHANCED OIL RECOVERY

CROSS REFERENCE TO RELATED APPLICATIONS

This application claims priority to International Application No. PCT/US2020/047601, filed on Aug. 24, 2020, which claims the benefit of U.S. Provisional Application No. 62/890,235, filed Aug. 22, 2019, which are each incorporated herein by reference in their entireties.

FIELD OF THE INVENTION

The present invention relates to compositions and methods for increased recovery of hydrocarbon from a subterranean hydrocarbon-bearing formation.

BACKGROUND

Chemical additives are used throughout the petroleum industry for increasing the rate or total amount of hydrocarbon compounds recovered from subterranean hydrocarbon-bearing reservoirs. Conventionally, chemical additives including one or more surfactants (and optionally other materials such as polymers) are combined with a fluid, usually a water source, and this combination is injected underground. Such combinations may be referred to as "injectates." The injected surfactants lower the interfacial tension between the fluid or connate (subterranean water source) and the hydrocarbon (oil); and may further change the wettability of the reservoir rock, thereby increasing the yield of hydrocarbon compounds released, the rate of their recovery, or both the yield and rate.

Injectates are suitably optimized for use in one or more specific industrial processes directed to maximizing yield of hydrocarbon recovery from a subterranean reservoir, maximizing the rate of recovery of hydrocarbon from a subterranean reservoir, or both. Such use may be before or after establishment of a well, wherein "well" is understood to indicate a fluid connection between a hydrocarbon within a subterranean reservoir, and a point proximal to the surface of the earth suitably situated to allow collection of the hydrocarbon from the reservoir. In man-made wells, this point may be referred to as a wellbore, which is a man-made fluid connection to a subterranean hydrocarbon-bearing reservoir. The wellbore may be adapted to collect hydrocarbon, to inject one more injectates, or both by including one or more pipes, tanks, pumps and the like. The use of injectates is not generally limited by the type of reservoir or the type of hydrocarbon, and injectates are injected into nearly every such formation in order to maximize yield of hydrocarbon obtained from the reservoir.

For example, injectates may be injected contemporaneously with establishment of a well, such as by hydraulic fracturing. An injectate may suitably be combined with a proppant, wherein the combination is a fracturing fluid. The fracturing fluid is used in a hydraulic fracturing process to establish a well. Surfactants present in the fracturing fluid may achieve well stimulation during fracturing, wherein applied hydraulic pressure can further assist in distributing the surfactants within the reservoir. Hydraulic fracturing techniques are useful to form new wells as well as to extend the life of existing wells. Injectates including surfactants are known to be useful in both of these applications.

Injectates are also used in enhanced recovery of hydrocarbons from wells. "Enhanced hydrocarbon recovery" refers to processes carried out after a well is established for the purpose of increasing the rate or total amount of hydrocarbon collected. Enhanced hydrocarbon recovery is typically initiated once a reduction in the rate of collection of hydrocarbon from the well is observed, in order to "reinvigorate" the well (often referred to in the art as secondary oil recovery) or when collection has substantially stopped (often referred to in the art as tertiary oil recovery). Injectates for enhanced hydrocarbon recovery conventionally include surfactants, polymers, or a combination thereof.

However, surfactants and mixtures thereof are often unstable or insoluble in the high temperature or high total dissolved solids water sources encountered in some subterranean reservoirs. For example, in some reservoirs temperatures in excess of 60° C. are encountered; temperatures can be as high as 250° C. Additionally, underground water (connate) is often characterized as having high total dissolved solids, such as about 4 wt % total dissolved solids and as much as about 35 wt % total dissolved solids. In some cases, a substantial portion of the dissolved solids are ionic (one or more salts).

Even further still, surfactants and mixtures thereof are often unstable or insoluble in concentrations above about 1-10 wt % active ingredients (non-solvent chemical additives). In some instances this instability is due to electronic interactions between ionic surfactants employed in the mixtures. Thus, conventional surfactant mixtures, such as concentrates for use in forming injectates, requires the incorporation, transportation, and storage of mixtures having as much as 90 wt % inactive ingredients. Such use of inactive ingredients is inefficient and wasteful.

In addition to the foregoing problems known to exist in the injectate art, there is a paucity of injectate compositions that are effective to increase either the rate or amount of hydrocarbon recoverable from wells characterized as having "tight" or "very tight" subterranean reservoir rock. Such tight rock is characterized as having permeability of about 0.1 milliDarcy (mD) or less, with "very tight" rock characterized as having permeability of about 0.01 mD or less. Some hydrocarbon-bearing shale formations have permeability as low as 0.0001 mD for example. Efficient recovery of hydrocarbons trapped within a tight rock matrix is a known problem in the industry. As petroleum supplies from conventional oilfield rock become depleted, technologies addressing the problem of tight rock will increase in importance and value.

During oil recovery, surfactant formulations such as concentrates (compositions including one or more surfactants and at least one solvent, usually water) may be added to water sources to produce injectates for enhanced oil recovery. Since usually such concentrates must be transported to the oil-recovery site, it is advantageous that such concentrates include the highest possible concentration of active ingredients such as surfactants, and the least diluent such as water, which is advantageously obtained and added to the concentrate at or as close as possible to the oil-recovery site or point of use. However, frequently in the field, the only water sources that may be available are water sources containing high total dissolved solids or high salinity. For example, for some landlocked oil reservoir locations, produced water may be the only easily available water source; and for marine or coastal locations such as oil rigs/oil platforms the only convenient water source may be seawater. Being able to use these water sources for combination with oil recovery compositions such as concentrates is thus highly advantageous. Further, produced water must be disposed of. Produced waters can include high concentrations of various inorganic salts or other chemical components that mean particular disposal methods are required. Use of produced water for reinjection to enhance oil-recovery assists in disposition of produced water.

Even if sources of fresh water or tap water are available, such water sources are valuable for other applications such as drinking water and farming, or are expensive to consume in the large quantities required for oil recovery purposes. Accordingly, it is highly advantageous to be able to use saline or other high total dissolved water sources to make up injectates for enhanced oil recovery in situ at the oil-recovery site.

Unfortunately, many otherwise useful surfactant packages for enhancing oil recovery are unstable when combined with high total dissolved solids water sources or saline water sources. For example, one or more surfactants may precipitate from aqueous solution or otherwise be rendered less dispersed in aqueous solution when mixed with seawater or other high total dissolved solids water sources, thereby rendering the surfactants less effective for enhancing oil recovery. Such processes may be accompanied by an development of turbidity on combination of the surfactants or concentrates thereof with the water sources.

There is a need in the industry for compositions that are stable in high temperature environments, high total dissolved solids environments, or high temperature/high total dissolved solids environments. There is a need in the industry for compositions that increase the yield of hydrocarbon compounds recovered from subterranean reservoirs without forming subterranean water-oil emulsions. There is a need in the industry for concentrates (concentrated injectates) to improve efficiency of manufacturing and transportation thereof. There is a need in the industry for concentrated compositions that are easily and quickly diluted prior to or during injection thereof into subterranean environments that include high total dissolved solids, high temperature, or a combination thereof. There is a need in the industry for compositions that increase the yield of hydrocarbon compounds recovered during hydraulic fracturing operations. There is a need in the industry for compositions that increase the yield of hydrocarbon compounds recovered during enhanced hydrocarbon recovery operations. There is a need in the industry for compositions that increase the yield of hydrocarbon compounds recovered from tight rock or very tight rock formations. There is a need in the industry for compositions that increase the yield of hydrocarbon recovered from reservoirs wherein the crude hydrocarbon has an API gravity of about 28 or less.

SUMMARY

Disclosed herein are compositions and methods for recovery of hydrocarbons from subterranean hydrocarbon-bearing reservoirs. The compositions include concentrates for combination with water sources such as seawater, produced water, and other high total dissolved solids or saline water sources to form injectates for oil recovery. Water sources such as seawater and produced water comprise dissolved species such as inorganic salts.

Disclosed herein are concentrated compositions (concentrates) useful for forming the injectates or fracturing fluids, that are stable at concentrations of surfactant exceeding 10 wt %, e.g. over 25%.

Also disclosed are methods of increasing hydrocarbon yield or rate of flow of a hydrocarbon from a subterranean oil reservoir, wherein the method includes injecting the injectates into the reservoir. In embodiments, the subterranean reservoir is a tight shale reservoir, a sandstone reservoir, or a carbonate reservoir. In embodiments, the subterranean reservoir includes low permeability—stated differently, the reservoir is characterized as having tight rock, or in some embodiments very tight rock.

Disclosed herein is a concentrate for enhanced oil recovery, the concentrate comprising, consisting of, or consisting essentially of (i) a sulfonated or sulfated surfactant; (ii) an alkoxylated alcohol surfactant; (iii) a coupling agent; (iv) a hydrotrope; (v) an additional surfactant, and (vi) water. In embodiments, the concentrate comprises about 10% to about 90% by weight water, in embodiments about 40% to about 80%, in embodiments about 50% to about 70%, in embodiments about 50% to about 65%, in embodiments about 55% to about 65%, in embodiments about 58% to about 62%, in embodiments about 60% by weight water.

In embodiments, the concentrate excludes a polymer. In embodiments, the concentrate excludes any compound having a molecular weight of greater than 1,000 daltons or having a number average molecular weight of greater than 1,000 daltons. In embodiments the concentrate excludes any compound having a molecular weight or a number average molecular weight of between 1,000 daltons and 100,000,000 daltons.

In embodiments, the additional surfactant is a zwitterionic surfactant. In embodiments, the concentrate excludes an anionic surfactant, a cationic surfactant, a nonionic surfactant, or any combination thereof with the exception of a sulfonated surfactant, a sulfated surfactant, and an alkoxylated surfactant.

In embodiments, the concentrate excludes a cationic surfactant. In embodiments, the concentrate does not comprise a nonionic surfactant.

In embodiments, the sulfonated surfactant comprises, consists of, or consists essentially of an internal olefin surfactant, in embodiments a C15 to C18 internal olefin sulfonate.

In embodiments, the alkoxylated alcohol surfactant is an alkoxylated carboxylated surfactant. In embodiments, the alkoxylated carboxylated surfactant has the formula $R^1$—O—$(R^2O)$m-$(CH_2)$—$CO_2X$, wherein $R^1$ is a C10 to C20 alkyl group, wherein $R^2$ is a C1 to C4 alkylene group, wherein m is 1 to 10, and wherein X is hydrogen or an alkali metal. In some such embodiments, $R^1$ is tridecyl, and $R^2$ is —$CH_2CH_2$—. In some such embodiments m is 3 or has a number average of about 3.

In embodiments, the coupling agent is selected from the group consisting of alcohols having 1-6 carbon atoms and alkyl ethers of alkylene glycols, wherein the alkyl of the alkyl ether has 1-6 carbon atoms. In embodiments, the coupling agent is ethylene glycol monobutyl ether.

In embodiments, the hydrotrope is selected from the group consisting of aryl sulfonates, aryl phosphates, or a combination thereof. In embodiments, the hydrotrope is an alkaryl sulfonate or an alkaryl phosphate. In embodiments, the hydrotrope is selected from xylene sulfonic acid or a salt thereof, and toluene phosphoric acid or a salt thereof. In embodiments, the hydrotrope is sodium xylene sulfonate or potassium toluene phosphate.

In embodiments, the additional surfactant is a zwitterionic surfactant. In embodiments, the additional surfactant is selected from the group consisting of betaines, sultaines, alkyl amine oxides, alkyl amphoacetates, alkylamphopropionates, alkyliminodipropionate, and any combination thereof. In embodiments, the one or more additional surfactants is lauryl betaine.

In embodiments, the total concentration of sulfonated or sulfated surfactant in the concentrate is 5 wt % to 15 wt % of the concentrate, the total concentration of the alkoxylated alcohol surfactant is 1 wt % to 5 wt % of the concentrate, the total concentration of the additional surfactant is 5 wt % to 15 wt % of the concentrate, and the total concentration of the coupling agent is 5 wt % to 15 wt % of the concentrate. In some such embodiments, the weight ratio of the hydrotrope to the total surfactant (the sulfonated or sulfated surfactants plus the alkoxylated alcohol surfactant plus the additional surfactants) is about 0.1:1 to about 0.2:1. In some such embodiments, the sulfonated surfactant is a C15 to C18 internal olefin sulfonate; the alkoxylated alcohol surfactant is an alkoxylated carboxylated surfactant having the formula $R^1$—O—($R^2$O)m-($CH_2$)—$CO_2$X, wherein $R^1$ tridecyl, $R^2$ is a —$CH_2CH_2$—, m is 3 or has a number average of 3, and X is hydrogen or an alkali metal ion; and the coupling agent is ethylene glycol monobutyl ether.

Disclosed herein are injectate compositions, the injectate compositions comprising, consisting of, or consisting essentially of any one of the concentrates disclosed herein and a water source. In embodiments, the total concentration of surfactant (the sulfonated or sulfated surfactant plus the alkoxylated alcohol surfactant plus the additional surfactant) in the injectate is 1.06 wt % to 1.18 wt %. The water source comprises, consists of, or consists essentially of water.

In embodiments, the water source is selected from seawater, produced water, and a combination thereof. In embodiments, the water source comprises 2.0 to 2.5 wt % of sodium chloride.

In embodiments, the injectate composition has a turbidity less than 800 NTU, in embodiments 300 to 800 NTU.

In embodiments, the interfacial tension of the injectate composition is 0.0065 to 0.03 mN/m.

DETAILED DESCRIPTION

Definitions

Figure 1:
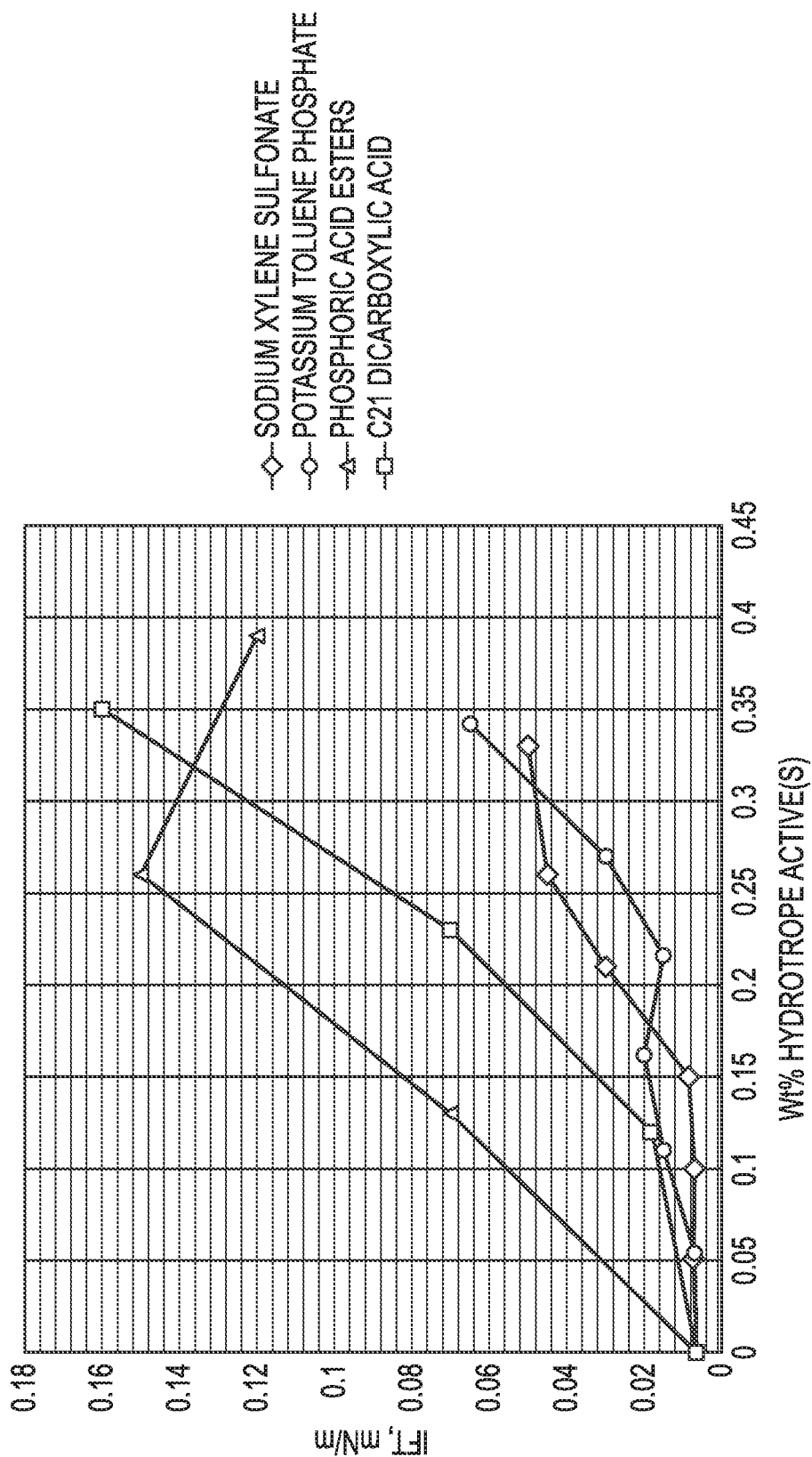
FIG. 1 is a plot of the interfacial tension of four injectates versus the weight percent hydrotrope in each injectate.

Unless otherwise defined, all technical and scientific terms used herein have the same meaning as commonly understood by one of ordinary skill in the art. In case of conflict, the present document, including definitions, will control.

As used herein, the term "surfactant" means a compound having at least one hydrophilic portion and at least one hydrophobic portion, wherein the compound is capable of spontaneous self-aggregation in aqueous compositions.

As used herein, the term "cationic surfactant" means a surfactant having one or more cationic moieties covalently bonded to the molecule and a net molecular charge that is positive.

As used herein, the term "anionic surfactant" means a surfactant having one or more anionic moieties covalently bonded to the molecule and a net molecular charge that is negative.

As used herein, the term "nonionic surfactant" means a surfactant having no ionic moieties covalently bonded to the molecule.

As used herein, the term "zwitterionic surfactant" means a surfactant having one or more anionic moieties covalently bonded to the molecule and one or more cationic moieties covalently bonded to the molecule, and a net molecular charge of zero. Stated differently, a zwitterionic surfactant is an electrically neutral compound having formal unit electrical charges of opposite sign.

As used herein, the term "water source" means water substantially in a liquid state and comprising, consisting essentially of, or consisting of fresh water, tap water, well water, deionized water, distilled water, produced water, municipal water, waste water such as runoff water, "gray" water, or municipal waste water, treated or partially treated waste water, brackish water, or sea water, or a combination of two or more such water sources as determined by context; and present. In embodiments, a water source includes one or more salts, ions, buffers, acids, bases, surfactants, or other dissolved, dispersed, or emulsified compounds, materials, components, or combinations thereof. The term "produced water" refers to a water source that is present within and/or flows from a subterranean reservoir; produced water includes connate unless otherwise specified.

As used herein, the term "stable" as applied to a composition means a kinetically stable composition that absent any force applied, temperature change, or chemical added, is or is capable of being substantially free of coagulation, plating out, precipitation, gross coalescence of phases (conventionally referred to as "separation") or any other evidence of instability for at least about 24 hours at about 20° C., or in some embodiments for a period of time between about 24 hours and about 200 hours, such as 48 hours, 72 hours, 96 hours, 120 hours, 144 hours, 168 hours, or 192 hours at about 20° C.

As used herein, the term "injectate" means a composition for injecting into a subterranean reservoir, or a composition that is injected into a subterranean reservoir, or a composition previously injected into a subterranean reservoir and present therein. The injectate may further include a proppant, wherein the combination of injectate and proppant is referred to herein as a "fracturing fluid". Discussions related to injectates and injection of injectates generally also relates to fracturing fluids and injection of fracturing fluids, as specified or determined by context. It will be understood that the proppant present in a fracturing fluid does not materially affect the chemical properties of the injectate but instead is chemically inert or substantially chemically inert within the fracturing fluid. As such, discussions relating to improved rate or yield of hydrocarbon from a subterranean reservoir due to injection of an injectate, including modification of properties such as interfacial energy or rock surface wettability also apply generally to fracturing fluids, unless otherwise specified or determined by context. In some embodiments, the injectate comprises, consists of, or consists essentially of a concentrate and a water source as defined herein.

As used herein, the term "well" refers to a fluid connection between a hydrocarbon within a subterranean reservoir, and a point proximal to the surface of the earth suitably situated to collect at least a portion of the hydrocarbon. Optionally, the point of collection is further adapted to collect the hydrocarbon, or to inject an injectate into the reservoir, or both. Similarly, the term "wellbore" refers to a man-made fluid connection to a hydrocarbon within a subterranean reservoir. A wellbore is adapted to collect the hydrocarbon, or to inject an injectate into the reservoir, or both, for example by including one or more pipes, tanks, pumps and the like. A well may include one wellbore, or two or more wellbores.

As used herein, the terms "hydrocarbon" and "oil" generally refer to crude petroleum products, unless otherwise specified or determined by context. Crude petroleum products are hydrocarbon compounds as recovered or collected from a subterranean reservoir, and prior to any further processing or refining thereof.

As used herein, the term "high temperature" refers to a water source, a subterranean reservoir, or a combination thereof having a temperature of about 60° C. to 120° C., as specified or determined by context.

As used herein, the term "high total dissolved solids" refers to a water source including at least about 0.5 wt % solids dissolved therein. In general, "saline" or "salinity" refers to a water source wherein a portion, in some embodiments a substantial portion, of the total dissolved solids is salts, as determined by context.

As used herein, the term "high pressure" means pressure in excess of atmospheric pressure on the surface of the earth, further as encountered within one or more subterranean reservoirs as a result of natural forces present within reservoir, as a result of human activity such as hydraulic fracturing, or a combination thereof.

As used herein, the term "tight rock" means solid subterranean rock having permeability of 0.01 milliDarcy (mD) to 0.1 milliDarcy and hydrocarbon entrained within the rock matrix. "Very tight rock" indicates permeability of 0.01 mD or less.

As used herein, the term "heavy oil" means crude hydrocarbon having American Petroleum Institute gravity, or "API gravity" of about 28 or less.

As used herein, the term "enhanced hydrocarbon recovery" or "enhanced oil recovery" refers to injection of compositions into a subterranean reservoir to increase the rate or total amount of hydrocarbon collected from a previously established well. Enhanced hydrocarbon recovery includes "secondary hydrocarbon (oil) recovery" which includes injection initiated when a reduction in the rate of flow of hydrocarbon from a well is observed. Enhanced hydrocarbon recovery also includes "tertiary hydrocarbon (oil) recovery", which includes injection initiated when rate of flow of hydrocarbon from a well has stopped or substantially stopped.

As used herein, unless otherwise stated, all concentrations are by weight.

As used herein, "organic phosphorus-functional compound" refers to a compound including at least one carbon-phosphorus covalent bond and/or a compound including at least one atom covalently bonded to both a carbon atom and a phosphorus atom.

As used herein, "wt %" means weight percent and refers to the weight of a specified material divided by the total weight including the specified material expressed as a percentage. For example, a 2.5 wt % sodium chloride solution in water refers to a solution in which for every 100 grams of solution 2.5 grams of sodium chloride is dissolved therein.

As used herein, "concentrate" refers to a composition comprising one or more surfactants and water, wherein the total concentration of the one or more surfactants is 10 wt % or greater, in embodiments greater than 15 wt %, in embodiments greater than 20 wt %, or in embodiments greater than 25 wt %, in some such embodiments 25 wt % to 50 wt %.

As used herein, the term "hydrotrope" means a compound that may solubilize hydrophobic compounds in aqueous solutions by means other than micellar solubilization.

As used herein, "sulfated surfactant" means a surfactant including at least one organic moiety bearing a sulfate group.

As used herein, "sulfonated surfactant" means a surfactant including at least one organic moiety bearing a sulfonate group.

As used herein, the term "coupling agent" means a water-soluble organic solvent.

As used herein, the terms "subterranean oil formation", "subterranean formation", "subterranean hydrocarbon-containing formation", "subterranean reservoir", "subterranean hydrocarbon reservoir", and like terms refer to a subterranean geological rock formation containing or in fluid communication with one or more hydrocarbon fluids. Hydrocarbon fluids include crude oil and gas. In this context, gas means one or more compounds that are ordinarily in a gaseous state of matter at 20° C. and one atmosphere pressure.

As used herein, the term "internal olefin sulfonate" means a sulfonate material produced by sulfonation of an internal olefin. The internal olefin sulfonate may include one or more monosulfonates, one or more disulfonates, and/or one or more higher sulfonates. Accordingly, as used herein, the term "internal olefin sulfonate surfactant" means an internal olefin sulfonate that lowers surface tension.

As used herein, the term "optional" or "optionally" means that the subsequently described component, event or circumstance may but need not be present or occur. The description therefore discloses and includes instances in which the event or circumstance occurs and instances in which it does not, or instances in which the described component is present and instances in which it is not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

Discussion

The following descriptions of the compositions include descriptions of individual components thereof, wherein any of the individual components are intended to be combined with any other individual components without limitation except where specified otherwise. In particular, discussions of concentrates, injectates, and fracturing fluids are intended to relate to each and every embodiment of these compositions disclosed below. Further, discussions of methods of use and related processes apply to methods of use and related processes for each and every concentrate, injectate, and fracturing fluid disclosed.

Disclosed herein are compositions for increasing rate or yield of collection of a hydrocarbon from subterranean reservoir thereof. The compositions are suitably concentrates, injectates, or fracturing fluids.

Concentrates

Disclosed herein is a concentrate for use in enhanced oil recovery, the concentrate comprising, consisting of, or consisting essentially of (i) a sulfonated surfactant, a sulfated surfactant, or a combination thereof; (ii) an alkoxylated alcohol surfactants; (iii) a coupling agent; (iv) a hydrotropes; (v) one or more additional surfactants, (vi) water, and (vii) one or more optional components.

In embodiments, the concentrate comprises about 10% to about 90% by weight water, in embodiments about 40% to about 80%, in embodiments about 50% to about 70%, in embodiments about 50% to about 65%, in embodiments about 54% to about 67%, in embodiments about 55% to about 65%, in embodiments about 58% to about 62%, or in embodiments about 60% by weight water.

In embodiments, the concentrate excludes a polymer. In embodiments, the concentrate excludes any compound having a molecular weight of greater than 1,000 daltons or having a number average molecular weight of greater than 1,000 daltons. In embodiments the concentrate excludes any compound having a molecular weight or a number average molecular weight of between 1,000 daltons and 100,000,000 daltons.

In embodiments, the concentrate excludes a cationic surfactant. In embodiments, the concentrate excludes a nonionic surfactant.

In embodiments, the total concentration of surfactant (in some such embodiments the total concentration of the one or more sulfonated and/or sulfated surfactants, the one or more alkoxylated alcohol surfactants, and the one or more additional surfactants) in the concentrate is about 10 wt % to about 75 wt %, in embodiments about 10 wt % to about 50 wt %, in embodiments about 10 wt % to about 40 wt %, in embodiments about 10 wt % to about 30 wt %, in embodiments about 15 wt % to about 30 wt %, in embodiments about 20 wt % to about 30 wt %, or in embodiments about 25 wt % to about 27 wt %.

Sulfonated and/or Sulfated Surfactants

In embodiments, the one or more sulfonated and/or sulfated surfactants comprises, consists of, or consists essentially of one or more alkyl sulfonate surfactant, one or more alkyl sulfate surfactants, one or more alpha-olefin sulfonated surfactants, one or more internal-olefin sulfonated surfactants, one or more alkyl alkoxylated sulfonated surfactants, one or more alkyl alkoxylated sulfated surfactants, or any combination thereof. In embodiments, the one or more sulfonated and/or sulfated surfactants comprises, consists of, or consists essentially of one or more alpha olefin sulfonated surfactants, one or more internal-olefin sulfonated surfactants, or a combination thereof. In embodiments, the one or more sulfonated and/or sulfated surfactants comprises, consists of, or consists essentially of one or more internal olefin sulfonated surfactants, one or more alpha olefin sulfated surfactants, or a combination thereof. In embodiments, the one or more sulfonated and/or sulfated surfactants comprises, consists of, or consists essentially of C8-C30 sulfonated internal olefin, C10 to C25 sulfonated internal olefin, C12-C20 sulfonated internal olefin, C14 to C18 sulfonated internal olefin, C8-C30 sulfonated alpha olefin, C10 to C25 sulfonated alpha olefin, C12-C20 sulfonated alpha olefin, C14 to C18 sulfonated alpha olefin, or any combination thereof. In embodiments, the olefin sulfonate is a sulfonic acid or a sulfonate salt. In embodiments, the sulfonate salt is an alkali metal salt, an ammonium salt. In embodiments, the sulfonate salt is a sodium salt, potassium salt, an ammonium salt, or any combination thereof.

In embodiments, the one or more sulfonated and/or sulfated surfactants comprises, consists of, or consists essentially of C15 to C18 internal olefin sulfonate. In embodiments, the olefin sulfonate is a sulfonic acid or a sulfonate salt. In embodiments, the sulfonate salt is an alkali metal salt, an ammonium salt. In embodiments, the sulfonate salt is a sodium salt, potassium salt, an ammonium salt, or any combination thereof.

A sulfonated olefin may be a combination of materials. In some embodiments, the sulfonated olefin comprises, consists of, or consists essentially of a hydroxyalkyl sulfonate and a compound including a hydrocarbon group having at least one double bond and a sulfonate group.

In embodiments, the concentration of the one or more sulfonated and/or sulfated surfactants in the concentrate is about 1 wt % to about 50 wt %, in embodiments about 1 wt % to about 25 wt %, in embodiments about 1 wt % to about 20 wt %, in embodiments about 5 wt % to about 15 wt %, in embodiments about 10 wt % to about 15 wt %, in embodiments about 11 wt % to about 12 wt %, or in embodiments about 11.7%.

Alkoxylated Alcohol Surfactants

In embodiments, the one or more alkoxylated alcohol surfactants comprises, consists of, or consists essentially of one or more anionic alkoxylated alcohol surfactants. In embodiments, the one or more alkoxylated alcohol surfactants comprises, consists of, or consists essentially of an alkoxylated carboxylated surfactant. In embodiments, the alkoxylated and carboxylated surfactant is linear or branched. In embodiments, the alkoxylated component of the alkoxylated carboxylated surfactant includes propoxylated moieties, ethoxylated moieties, and combinations thereof. In embodiments, the alkoxylated component includes propoxylated then ethoxylated moieties, ethoxylated then propoxylated moieties, randomly propoxylated ethoxylated moieties, and any combinations thereof.

In embodiments, the one or more alkoxylated alcohol surfactants comprises, consists of, or consists essentially of one or more alkoxylated carboxylated surfactants having the formula $R^1$—O—$(R^2O)$m-$(CH_2)$—$CO_2X$, wherein $R^1$ is a C10 to C20 alkyl group, wherein $R^2$ is a C1 to C4 alkylene group, wherein m is 1 to 10, and wherein X is hydrogen or an alkali metal. In some such embodiments, $R^1$ is tridecyl, and $R^2$ is —$CH_2CH_2$—. In some such embodiments m is 3 and/or has a number average of about 3.

In embodiments, the concentration of the one or more alkoxylated alcohol surfactants in the concentrate is about 0.1 wt % to about 10 wt %, in embodiments about 1 wt % to about 10 wt %, in embodiments about 0.1 wt % to about 5 wt %, in embodiments about 1 wt % to about 5 wt %, in embodiments about 1 wt % to about 3 wt %, in embodiments about 2 wt % to about 3 wt %, in embodiments about 2.5 wt % to about 3 wt %, or in embodiments about 2.8 wt %.

Coupling Agents

Suitable coupling agents comprise, consist essentially of, or consist of linear, branched, or cyclic aliphatic alcohols having 1 to 6 carbon atoms, diols having 1 to 6 carbon atoms, alkyl ethers of alkylene glycols wherein the alkyl moiety has 1 to 6 carbon atoms (e.g., ethylene glycol mono-n-butyl ether), polyalkylene glycols, and mixtures thereof. Also useful as coupling agents are glycol and glycerol based acetals and ketals, such as those formed from the condensation of e.g. glycerol with formaldehyde, acetone, or oxocarboxylic acids, semialdehydes, and esters thereof such as levulinic acid or an alkyl levulinate. In embodiments, the coupling agent comprises, consists essentially of, or consists of methanol, ethanol, propanol, butanol, glycerol, ethylene glycol, ethylene glycol monoalkyl ether wherein the ether moiety comprises 1 to 6 carbon atoms, or a combination of two or more thereof. In some embodiments, the coupling agent consists essentially of ethylene glycol monobutyl ether.

In embodiments, the one or more coupling agents is selected from short chain alcohols having 1 to 6 carbon atoms, diols having 1 to 6 carbon atoms, glycerol, polyalkylene glycols having less than 6 kD, and combinations thereof. Representative short chain alcohols include for example at least methanol, ethanol, n-propanol, and combinations thereof. Representative diols include, for example, methylene glycol, ethylene glycol, propylene glycol, and combinations thereof.

In embodiments, the one or more coupling agents is selected from the group consisting of alcohols having 1-6 carbon atoms and alkyl ethers of alkylene glycols, wherein the alkyl of the alkyl ether has 1-6 carbon atoms. In embodiments, the one or more coupling agents comprises, consists of, or consists essentially of ethylene glycol monobutyl ether.

In embodiments, the concentration of the one or more coupling agents in the concentrate is about 0.1 wt % to about 25 wt %, in embodiments about 1 wt % to about 20 wt %, in embodiments about 5 wt % to about 20 wt %, in embodiments about 5 wt % to about 15 wt %, or in embodiments about 10 wt %.

Hydrotropes

In embodiments, the one or more hydrotropes is selected from the group consisting of aryl sulfonates, alkaryl sulfonates, arylalkyl sulfonates, aryl sulfates, alkaryl sulfates, arylalkyl sulfates, aryl phosphates, alkyl phosphates, alkaryl phosphates, arylalkyl phosphates, and any combination thereof. In embodiments, the one or more hydrotropes comprises, consists of, or consists essentially of at least one alkaryl sulfonate, at least one alkaryl phosphate, or a combination thereof.

In embodiments, the one or more hydrotropes comprises, consists of, or consists essentially of one or more compounds having the structure I,

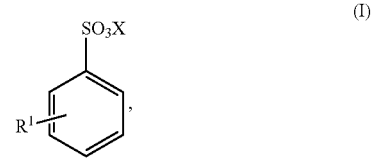

wherein $R^1$ is linear or branched C1-C6 alkyl, and wherein X is hydrogen or an alkali metal.

In embodiments, the one or more hydrotropes comprises, consists of, or consists essentially of one or more compounds having the structure II,

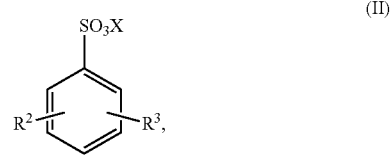

wherein X is H or an alkali metal, and wherein $R^2$ and $R^3$ are independently selected from C1 to C3 alkyl. In some such embodiments, $R^2$ and $R^3$ are both methyl.

In embodiments, the one or more hydrotropes comprises, consists of, or consists essentially of one or more compounds having the structure III,

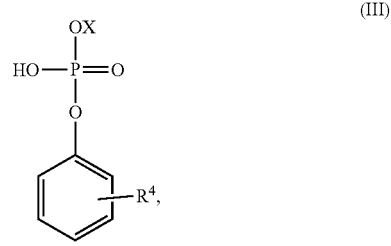

wherein X is H or an alkali metal and $R^4$ is a C1-C6 alkyl. In some such embodiments, $R^4$ is methyl.

In embodiments, the one or more hydrotropes excludes any organic phosphorus-functional compounds except for compounds of formula III and compounds of formula IV. As used herein, organic phosphorus-functional compound refers to a compound including at least one carbon-phosphorus covalent bond and/or a compound including at least one atom covalently bonded to both a carbon atom and a phosphorus atom.

In embodiments, the one or more hydrotropes comprises, consists of, or consists essentially of one or more compounds having the structure IV,

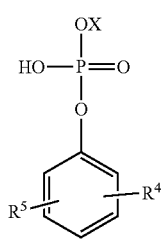

(IV)

wherein X is hydrogen or alkali metal, and $R^4$ and $R^5$ are independently selected from C1 to C3 alkyl. In some such embodiments, $R^5$ and $R^6$ are both methyl.

In embodiments, the one or more hydrotropes excludes organic phosphorus-functional compounds except for compounds of formula III, compounds of formula IV, or a combination thereof.

In embodiments, the one or more hydrotropes comprises, consists of, or consists essentially of xylene sulfonic acid and/or a salt thereof, toluene phosphoric acid and/or a salt thereof, or any combination thereof. In embodiments, the one or more hydrotropes comprises, consists of, or consists essentially of sodium xylene sulfonate, potassium toluene phosphate, or a combination thereof. Sodium xylene sulfonate refers herein to the sodium salt(s) of xylene sulfonic acid. Potassium toluene phosphoric acid refers to the potassium salt(s) of toluene phosphoric acid.

Xylene sulfonic acid herein refers to a compound or a mixture of compounds, wherein the compound or each compound in the mixture of compounds has the structure V:

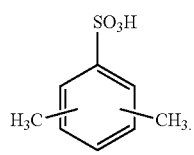

(V)

Toluene phosphoric acid herein refers to a compound or mixture of compounds, wherein the compound or each compound in the mixture of compounds has the structure VI:

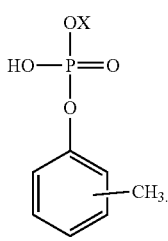

(VI)

In embodiments, the one or more hydrotropes excludes phosphorus-functional compounds except for compounds of formula III, compounds of formula IV, compounds of formula V, compounds of formula VI, or a combination of two or more thereof.

In embodiments, the molar ratio of the one or more coupling agents to the one or more hydrotropes is about 2:1 to about 25:1, in embodiments about 3:1 to about 24:1, in embodiments about 2:1 to about 10:1, in embodiments about 3:1 to about 9:1, in embodiments 3:1 to about 7:1, in embodiments 4:1 to about 6:1, in embodiments about 4:1 to about 5:1 or in embodiments about 5:1.

In embodiments, the one or more hydrotropes comprises, consists of, or consists essentially of sodium xylene sulfonate, and the ratio of the weight of sodium xylene sulfonate to the total weight of surfactants in the concentrate is about 0.08:1 to about 0.19:1, in embodiments about 0.09:1 to about 0.18:1, or in embodiments about 0.13:1.

In embodiments, the one or more hydrotropes comprises, consists of, or consists essentially of sodium xylene sulfonate, and the concentrate comprises about 0.01 to 0.025 moles of the sodium xylene sulfonate per 100 grams of the concentrate, in embodiments about 0.012 to about 0.023 moles per 100 grams of concentrate, or in embodiments about 0.017 moles per 100 grams of concentrate.

In embodiments, the one or more hydrotropes comprises, consists of or consists essentially of an alkaryl sulfonate, and the molar ratio of the one or more coupling agents to the one or more hydrotropes is about 2:1 to about 10:1, in embodiments about 5:2 to about 19:2, in embodiments about 3:1 to about 9:1, in embodiments 3:1 to about 7:1, in embodiments 4:1 to about 6:1, in embodiments about 4:1 to about 5:1 or in embodiments about 5:1. In some such embodiments, the one or more hydrotropes comprises, consists of, or consists essentially of one or more xylene sulfonates. In some such embodiments, the one or more hydrotropes comprises, consists of, or consists essentially of sodium xylene sulfonate.

In embodiments, the one or more hydrotropes comprises, consists of, or consists essentially of potassium toluene phosphate and the ratio of the weight of potassium toluene phosphate to the total weight of surfactants in the concentrate is about 0.04:1 to about 0.25:1, in embodiments about 0.05:1 to about 0.24:1, or in embodiments about 0.05:1 to about 0.19:1.

In embodiments, the one or more hydrotropes comprises, consists of, or consists essentially of potassium toluene phosphate and the concentrate comprises about 0.005 moles to about 0.030 moles of the potassium toluene phosphate per 100 grams of the concentrate, in embodiments about 0.0056 moles to about 0.028 moles, or in embodiments about 0.0056 moles to about 0.022 moles per 100 grams of the concentrate.

In embodiments, the one or more hydrotropes comprises, consists of, or consists essentially of an alkaryl phosphate, and the molar ratio of the one or more coupling agents to the one or more hydrotropes is about 1:1 to about 25:1, in embodiments about 2:1 to about 25:1, in embodiments about 2:1 to about 20:1, in embodiments about 5:2 to about 24:1, in embodiments about 3:1 to about 24:1, in embodiments about 2:1 to about 10:1, in embodiments about 3:1 to about 10:1, in embodiments about 3:1 to about 9:1, in embodiments 3:1 to about 7:1, in embodiments 4:1 to about 6:1, in embodiments about 4:1 to about 5:1 or in embodiments about 5:1.

In embodiments, the one or more hydrotropes comprises, consists of, or consists essentially of an alkaryl sulfate, an alkaryl sulfonate, or a combination thereof. In some such embodiments, the concentrate comprises about 0.01 to about 0.025 moles of the one or more hydrotropes per 100 grams of concentrate, in embodiments about 0.015 to about 0.02 moles per 100 grams of concentrate, or in embodiments about 0.017 moles per 100 g of concentrate. In some such embodiments, the alkaryl sulfonate is sodium xylene sulfonate.

In embodiments, the one or more hydrotropes comprises, consists of, or consists essentially of an alkaryl phosphate. In some such embodiments, the concentrate comprises about 0.005 to about 0.03 moles of the one or more hydrotropes per 100 grams of concentrate, in embodiments about 0.006 to about 0.025 moles per 100 grams of concentrate, in embodiments about 0.006 moles to about 0.022 moles per 100 grams of concentrate, in embodiments about 0.01 to about 0.025 moles of the one or more hydrotropes per 100 grams of concentrate, in embodiments about 0.015 to about 0.02 moles per 100 grams of concentrate, or in embodiments about 0.017 moles per 100 g of concentrate. In some such embodiments, the alkaryl phosphate is potassium toluene phosphate.

Additional Surfactants

In embodiments, the one or more additional surfactants excludes an anionic surfactant. In embodiments, the one or more additional surfactants excludes a cationic surfactant. In embodiments, the one or more additional surfactants excludes a nonionic surfactant. In embodiments, the one or more additional surfactants excludes a combination of two or more of the following: an anionic surfactant, a cationic surfactant, and a nonionic surfactant.

In embodiments, the one or more additional surfactants comprises, consists of, or consists essentially of one or more zwitterionic surfactants. The zwitterionic surfactant includes at least one internal anionic moiety, at least one internal cationic moiety, and has a net internal charge of zero. In embodiments, the zwitterionic surfactant consists essentially of a single internal cation, a single internal anion, and a hydrophobic moiety selected from linear, branched, alicyclic, aryl, and alkaryl groups having 6 to 50 carbon atoms. In embodiments, the zwitterionic surfactant includes at least one internal cationic moiety comprising ammonium or phosphonium; and at least one internal anionic moiety comprising sulfonate, sulfate, oxide, carboxylate, phosphate, phosphite, or phosphonate. In embodiments, the zwitterionic surfactant includes at least one internal cationic moiety comprising ammonium or phosphonium; and at least one internal anionic moiety comprising sulfonate. In embodiments, the zwitterionic surfactant includes at least one internal hydroxyl group.

Examples of useful zwitterionic surfactants include those having a hydrophobic moiety selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 12 to 30 carbon atoms. One useful class of zwitterionic surfactants is amino acids having a hydrophobic moiety selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 12 to 30 carbon atoms, including for example N-dodecyl-N,N-dimethyl glycine. Another class of useful zwitterionic surfactants is trialkylamine oxides having a hydrophobic moiety selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 12 to 30 carbon atoms. Representative examples of such zwitterionic surfactants include N,N-dimethyl-N-dodecyl amine oxide, N,N-dimethyl-N-hexadecyl amine oxide, N,N-dimethyl-N-octadecyl amine oxide, and N,N-dimethyl-N—(Z-9-octadecenyl)-N-amine oxide.

Another class of useful zwitterionic surfactants is betaines, which include one internal carboxylate moiety, one internal ammonium moiety, and a hydrophobic moiety selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 12 to 30 carbon atoms. Representative but nonlimiting examples of betaines include 2-(dodecyldimethylammonio)acetate (CAS No. 683-10-3), cocoamidopropyl betaine (2-[3-(dodecanoylamino)propyl-dimethylazaniumyl]acetate), dodecanamidopropyl betaine ({2-[3-(dodecanoylamino)propyl]triazan-2-ium-2-yl}acetate), cetyl betaine (2-[hexadecyl(dimethyl)azaniumyl]acetate), oleamidopropyl betaine ((Z)-(carboxymethyl)dimethyl-3-((1-oxo-9-octadecenyl)amino) propylammonium hydroxide), and caprylamidopropyl betaine (2-[dimethyl-[3-(octanoylamino)propyl]azaniumyl] acetate). Another class of useful zwitterionic surfactants is sultaines, which include one internal sulfonate moiety and one internal ammonium moiety (also referred to as sulfobetaines). Examples of sultaines are lauryl sulfobetaine (3-(dodecyldimethylammonio)propane-1-sulfonate), caprylyl sulfobetaine (3-[decyl(dimethyl)azaniumyl]propane-1-sulfonate), myristyl sulfobetaine (3-[dimethyl(tetradecyl) azaniumyl]propane-1-sulfonate), Sulfobetaine 10 (CAS No. 15163-36-7), Sulfobetaine 3-14 (N-tetradecyl-N,N-dimethyl-3-ammonio-1-propanesulfonate), Sulfobetaine 3-10 (N-decyl-N,N-dimethyl-3-ammonio-1-propanesulfonate); alkylether hydroxypropyl sultaines and alkyldimethylhydroxysultaines such as lauryl hydroxysultaine (3-[dodecyl (dimethyl)ammonio]-2-hydroxypropane-1-sulfonate; 351.55 g/mol; CAS No. 13197-76-7), myristamidopropyl hydroxysultaine (2-hydroxy-N,N-dimethyl-N-(3-((1-oxotetradecyl)amino)propyl)-3-sulfo-, inner salt); and the like. Mixtures of such surfactants having various carbon chain lengths are obtained in some embodiments; for example, 3-((C10-C16)-alkyldimethylammonio)-2-hydroxypropane-sulfonate (CAS No. 72869-77-3) is a mixture of alkylated moieties having an average of 10 to 16 carbons.

Another class of useful zwitterionic surfactants is phosphate functional zwitterionic surfactants, which include one internal phosphate moiety, one internal ammonium moiety, optionally a carboxylate moiety, and either one or two hydrophobic moieties, wherein each hydrophobic moiety is selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 12 to 30 carbon atoms. Representative but nonlimiting examples of phosphate functional zwitterionic surfactants include phosphatidylserines, phosphatidylethanolamines, phosphatidylcholines such as 1-oleoyl-2-palmitoyl-phosphatidylcholine, and sphingomyelins.

In embodiments, the zwitterionic surfactant comprises sulfonate moieties. In embodiments, the zwitterionic surfactant comprises a hydroxyl moiety.

In embodiments, the one or more additional surfactants is selected from the group consisting of betaines, sultaines, alkyl amine oxides, alkyl amphoacetates, alkylamphopropionates, alkyliminodipropionate, and any combination thereof.

In embodiments, the one or more additional surfactants is selected from the group consisting of cocoamidopropyl betaine, cocodimethyl betaine, N,N-dimethyl hexadecaneamine N-oxide, cocodimethyl amine oxide, cocoamidopropyl hydroxy sultaine, lauryl hydroxysultaine, lauryl betaine, and any combination thereof.

In embodiments, the one or more surfactants is selected from betaines.

In embodiments, the one or more additional surfactants comprises, consists of, or consists essentially of lauryl betaine.

In embodiments, the concentration of the one or more additional surfactants in the concentrate is about 1 wt % to about 50 wt %, in embodiments about 1 wt % to about 25 wt %, in embodiments about 1 wt % to about 20 wt %, in embodiments about 5 wt % to about 15 wt %, in embodiments about 10 wt % to about 15 wt %, in embodiments about 11 wt % to about 12 wt %, or in embodiments about 11.7%.

Injectates

Injectates are formed by combining concentrates and high total dissolved solids water sources. Injectates including sodium xylene sulfonate, a hydrotrope, obtain improved oil recovery when injected into a subterranean oil reservoir as compared with injectates that do not include the hydrotrope.

The addition of the hydrotropes increases the surface tension of injectates. Higher surface tensions are expected to lead to lower oil recovery. However, we have discovered that the addition of the hydrotropes increases the compatibility of the surfactants with high total dissolved solids water sources, as judged by decreases in turbidity. Improved compatibility is expected to lead to improved oil recovery. Accordingly, and completely unexpectedly, two contradictory principles appear to be at work, whereby additional hydrotrope appears to improve compatibility of the surfactants with saline and other high-solids water sources, but additional hydrotrope also increases surface tension of the resulting injectate. Accordingly, the amount of hydrotrope is very important in maximizing the oil recovery.

Disclosed herein are injectate compositions, the injectate compositions comprising, consisting of, or consisting essentially of any one of the concentrates disclosed herein and a water source. In embodiments, the total concentration of surfactant (in some such embodiments, the one or more sulfonated and/or sulfated surfactants plus the one or more alkoxylated alcohol surfactants plus the one or more additional surfactants) in the injectate is about 0.1 wt % to about 10 wt %, in embodiments about 0.1 wt % to about 5 wt %, in embodiments about 1 wt % to about 5 wt %, in embodiments about 0.1 wt % to about 4 wt %, in embodiments about 1 wt % to about 4 wt %, in embodiments about 0.1 wt % to about 3 wt %, in embodiments about 1 wt % to about 3 wt %, in embodiments about 0.001 wt % to about 2 wt %, in embodiments about 0.1 wt % to about 2 wt %, in embodiments about 1 wt % to about 2 wt %, in embodiments about 1.06 wt % to about 1.18 wt %, in embodiments about 1.09 wt % to about 1.15% wt %, or in embodiments about 1.12 wt %.

In embodiments, the injectate comprises sodium xylene sulfonate, and the ratio of the weight of sodium xylene sulfonate to the total weight of surfactants in the injectate is about 0.04:1 to about 0.1:1, in embodiments 0.08:1 to about 0.19:1, in embodiments about 0.09:1 to about 0.18:1, or in embodiments about 0.13:1.

In embodiments, injectate comprises potassium toluene phosphate and the ratio of the weight of potassium toluene phosphate to the total weight of surfactants in the concentrate is about 0.02:1 to about 0.13:1, in embodiments about 0.04:1 to about 0.25:1, in embodiments about 0.05:1 to about 0.24:1, or in embodiments about 0.05:1 to about 0.19:1.

In embodiments, the injectate composition has a turbidity less than 800 NTU, in embodiments about 100 NTU to about 790 NTU, in embodiments about 100 NTU to about 700 NTU, in embodiments about 300 NTU to about 700 NTU, in embodiments about 340 NTU to about 710 NTU, in embodiments about 300 to about 800 NTU, in embodiments about 440 NTU to about 700 NTU, or in embodiments about 340 NTU to about 510 NTU.

In embodiments, the interfacial tension of the injectate composition is 0.0065 to 0.03 mN/m, in embodiments about 0.0065 to about 0.02 mN/m, in embodiments about 0.0065 to about 0.01 mN/m, in embodiments about 0.005 to 0.03 mN/m, in embodiments about 0.005 to about 0.02 mN/m, in embodiments about 0.005 to about 0.01 mN/m, in embodiments about 0.001 to about 0.03 mN/m, in embodiments about 0.001 to about 0.02 mN/m, or in embodiments about 0.001 to about 0.01 mN/m.

Water Sources

The water source in the concentrate, the injectate, or both the concentrate and the injectate comprises, consists of, or consists essentially of water.

In embodiments, the water source is selected from seawater, produced water, tap water, distilled water, deionized water, brine, and any combination thereof.

In embodiments, the water source is selected from seawater, produced water, and a combination thereof.

In embodiments, the water source comprises about 2.0% to about 2.5 wt % of sodium chloride.

In embodiments, the water source comprises about 5,000 ppm by weight to about 20,000 ppm by weight of $Na^{2+}$, in embodiments about 7,000 ppm to about 15,000 ppm, in embodiments about 1,000 ppm to about 50,000 ppm, in embodiments about 10,000 ppm to about 12,000 ppm, in embodiments about 11,000 ppm, or in embodiments 11,110 ppm by weight of $Na^{2+}$.

In embodiments, the water source comprises about 500 ppm to about 2,500 ppm by weight of $Mg^{2+}$, in embodiments about 500 ppm to about 2,000 ppm, in embodiments about 1,000 ppm to about 1,500 ppm, or in embodiments about 1,400 ppm, or in embodiments 1,370 ppm by weight of $Mg^{2+}$.

In embodiments, the water source comprises 0 ppm to 1,000 ppm by weight of $Ca^{2+}$, in embodiments about 100 ppm to about 1,000 ppm, in embodiments about 200 ppm to about 700 ppm, in embodiments about 400 ppm to about 500 ppm, in embodiments about 450 ppm, or in embodiments 430 ppm by weight of $Ca^{2+}$.

In embodiments, the water source comprises about 100 ppm to about 50,000 ppm by weight $Cl^-$, in embodiments about 5,000 ppm to about 40,000 ppm, in embodiments about 10,000 ppm to about 200,000 ppm, in embodiments about 10,000 ppm to about 30,000 ppm, in embodiments about 20,000 ppm, or in embodiments 19,650 ppm by weight of $Cl^-$.

In embodiments, the water source comprises about 500 ppm to about 10,000 ppm by weight of $SO_4^{2-}$, in embodiments about 1,000 ppm to about 5,000 ppm, in embodiments about 2,000 ppm to about 3,500 ppm, in embodiments about 3,000 ppm, or in embodiments 2,960 ppm by weight $SO_4^{2-}$.

In embodiments the water source comprises about 2 ppm to about 10 ppm of $HCO_3^-$, in embodiments about 7 ppm, or in embodiments 7.26 ppm by weight of $HCO_3^-$.

In embodiments, the water source comprises 0 wt % to 30 wt % total dissolved solids, in embodiments about 5 wt % to 35 wt %, in embodiments about 10 wt % to 30 wt %, about 1 wt % to 30 wt %, in embodiments about 4 wt % to 30 wt %, or in embodiments about 1 wt % to about 5 wt %, in embodiments about 3.5 wt % solids, or in embodiments 3.553 wt % total dissolved solids. In some embodiments, the water source consists essentially of water; this is most likely to be true with regard to the concentrates. In some embodiments, the water source is produced water and/or seawater; this is most likely to be true with regard to the injectates.

In some embodiments the water source is a high temperature water source, a high total dissolved solids water source, or a high temperature, high total dissolved solids water source. In embodiments, conditions within the subterranean reservoir include high temperature, high total dissolved solids water sources, high pressure, or a combination of two or more thereof in at least one subterranean area contacted by the injectate.

Any combination of the above components is suitably combined to form a composition for use in obtaining hydrocarbon product from a hydrocarbon-bearing subterranean reservoir. Concentrates according to the above description and combined in any manner and including any of the above components in any combination are suitably formed and then stored and/or diluted as described above and using any of the conditions described above in any combination. Injectates according to the above description and combined in any manner and including any of the above components in any combination are suitably formed using any of the conditions described above in any combination. Injectates are suitably formed by dilution of concentrates, or by direct combination of injectate components. Concentrates are used to form injectates, optionally after a storage period. Injectates are used to inject into a hydrocarbon-bearing subterranean reservoir. The injectates are used to obtain hydrocarbon products from hydrocarbon-bearing subterranean reservoirs.

The dilution of the concentrate to form the injectate is accomplished using a water source; in some embodiments the water source comprises, consists essentially of, or consists of produced water. In some embodiments, one or more proppants are added to the concentrate or to the injectate for purposes of hydraulic fracturing, wherein the combination of injectate and proppant is referred to as a fracturing fluid. Suitable proppants comprise, consist of, or consist essentially of sand or aluminum oxide. Other additives suitably added to the concentrates, injectates, or fracturing fluids include pH adjustment agents such as mineral acids or bases, or other additives incorporated by the operator for use in the specific subterranean reservoir from which a hydrocarbon is being recovered, and/or in conjunction with the specific step being carried out in the recovery of the hydrocarbon. In other embodiments, one or more such additives are included in the concentrate instead, and thus are not added by the operator in the field.

After subterranean injection, rock contacted by an injectate according to any of the above embodiments changes from oil-wettable to water-wettable. For example, the contact angle of an oil drop on an oil-saturated rock surface is 0° or substantially 0°; by contacting the oily rock surface with an injectate, the contact angle of an oil drop on the contacted rock surface is changed to about 60° to 100°, or about 60° to 95°, or about 60° to 90°, or about 70° to 100°, or about 80° to 100°, or about 70° to 90°, or about 80° to 90°. Yet the components of the injectates exhibit a low tendency to adsorb onto the rock, which means that the surfactants are not rapidly depleted from the injectate as it flows within the subterranean reservoir.

Injecting the injectates into a subterranean reservoir substantially increases the yield, rate of flow, or both of hydrocarbons obtained from a well in fluid connection to a hydrocarbon-bearing subterranean reservoir. Injecting the injectates into a well increases yield, rate of flow, or both of hydrocarbons obtained from reservoirs comprising high temperature water sources, high total dissolved solids water sources, or high temperature/high total dissolved solids water sources. Injecting the injectates into a well increases yield, rate of flow, or both of hydrocarbons obtained in enhanced hydrocarbon recovery processes, including secondary oil recovery and tertiary oil recovery. Injecting the injectates into a well increases yield, rate of flow, or both of hydrocarbons obtained from reservoirs characterized as having tight rock, or even very tight rock. Injecting the injectates into a well increases yield, rate of flow, or both of hydrocarbons obtained from reservoirs wherein the hydrocarbon is characterized as "heavy oil" or as having a high paraffin content.

In any of the above injecting, the injectate may further include a proppant such as sand or aluminum oxide, wherein this mixture is characterized as a fracturing fluid. Injection of a fracturing fluid is carried out contemporaneously with an hydraulic fracturing process, employing the fracturing fluid as the hydraulic fluid. In such processes, the fracturing fluids described herein are effective to increase the rate of collection, total yield of hydrocarbon collection, or both from tight shale reservoirs, including those typically subjected to hydraulic fracturing methodologies. We have found that the disclosed compositions provide highly desirable performance attributes for recovery of hydrocarbon compounds from hydrocarbon-containing subterranean fractured rock formations. Injectate/fracturing fluid performance is added to the beneficial performance of the concentrates which are pumpable or pourable and easily combined with a water source to form the injectates.

The injectates and fracturing fluids described herein alter the wettability of the reservoir rock from oil-wet to water-wet, while exhibiting low adsorption to the rock itself so as to minimize the rate of surfactant depletion as the composition proceeds to flow within the subterranean reservoir. The presently disclosed compositions also impart low interfacial tension to water sources comprising high salinity and/or total dissolved solids of up to about 30 wt %, yet prevent formation of emulsions with the hydrocarbon products that are the target of the recovery operation. Finally, the presently disclosed compositions are stable within the subterranean reservoir while exhibiting all of the foregoing properties. The aqueous environment within tight shale reservoirs can include high temperature, high total dissolved solids, high pressure, or a combination of two or more thereof.

Optional Components

In embodiments, the concentrate, the injectate, or both the concentrate and the injectate includes one or more optional components. In embodiments, the one or more optional components is selected from proppants, demulsifiers, anticorrodents, descaling agents, and any combination thereof. In embodiments, the concentrate excludes one or more optional components selected from proppants, demulsifiers, anticorrodents, descaling agents, and any combination thereof.

Optionally, one or more demulsifiers are added to a concentrate or injectate to improve the ability of the resulting injectates to prevent emulsions from forming within the subterranean reservoir. The demulsifiers are polymeric. Where present, the demulsifiers are selected from the group consisting of polyethylenimine alkoxylates, alkoxylated alkylphenol formaldehyde resins, alkoxylated amine-modified alkylphenol formaldehyde resins, ethylene oxide/propylene oxide copolymers, crosslinked ethylene oxide/propylene oxide copolymers, and mixtures of these. Where employed in the concentrates, the demulsifier is present in the concentrates at about 0.01 wt % to 5 wt % based on the total weight of the concentrate, for example about 0.05 wt % to 5 wt %, or about 0.1 wt % to 5 wt %, or about 0.2 wt % to 5 wt %, or about 0.3 wt % to 5 wt %, or about 0.4 wt % to 5 wt %, or about 0.5 wt % to 5 wt %, or about 0.6 wt % to 5 wt %, or about 0.7 wt % to 5 wt %, or about 0.8 wt % to 5 wt %, or about 0.9 wt % to 5 wt %, or about 1.0 wt % to 5 wt %, or about 0.01 wt % to 4.5 wt %, or about 0.01 wt % to 4.0 wt %, or about 0.01 wt % to 3.5 wt %, or about 0.01 wt % to 3.0 wt %, or about 0.01 wt % to 2.5 wt %, or about 0.01 wt % to 2.0 wt %, or about 0.01 wt % to 1.5 wt %, or about 0.01 wt % to 1.0 wt %, or about 0.5 wt % to 4 wt %, or about 0.5 wt % to 3 wt %, or about 0.5 wt % to 2 wt % based on the total weight of a concentrate. In embodiments, the compositions include one or more of the foregoing demulsifiers but exclude or substantially exclude other polymeric species.

Optional components may include those oil field additives conventionally used in hydraulic fracturing or post-primary fracturing of subterranean hydrocarbon-containing formations. In some embodiments, the additives are added to the concentrates, and the resulting concentrates are stable, or even storage stable. In other embodiments, the additives are not added to the concentrate, but rather are added to the subterranean reservoir contemporaneously with dilution of the concentrate to form a injectate, or are added to the injectate after the injectate is formed. Additives optionally included in the compositions include clay stabilizers, corrosion inhibitors, scale inhibitors, viscosifying agents, flow back aids, friction reducers, proppants, biocides, or mixtures thereof or in various combinations depending on the chemical and physical attributes of the subterranean reservoir addressed and optimization by the operator in such environments.

Suitable clay stabilizers employed in the compositions comprise, consist essentially of, or consist of quaternary ammonium salt polymers having weight average molecular weights of about 500 g/mol to 10,000 g/mol, choline chloride, inorganic salts, and mixtures thereof. Inorganic salts usefully employed as clay stabilizers include KCl, $CaCl_2$, and $MgCl_2$.

The amount of clay stabilizer employed in a composition is about 1 wt % to 25 wt % based on the total weight of a concentrate, for example about 2 wt % to 25 wt %, or about 3 wt % to 25 wt %, or about 4 wt % to 25 wt %, or about 5 wt % to 25 wt %, or about 6 wt % to 25 wt %, or about 7 wt % to 25 wt %, or about 8 wt % to 25 wt %, or about 9 wt % to 25 wt %, or about 10 wt % to 25 wt %, or about 11 wt % to 25 wt %, or about 12 wt % to 25 wt %, or about 13 wt % to 25 wt %, or about 14 wt % to 25 wt %, or about 15 wt % to 25 wt %, or about 1 wt % to 24 wt %, or about 1 wt % to 23 wt %, or about 1 wt % to 22 wt %, or about 1 wt % to 21 wt %, or about 1 wt % to 20 wt %, or about 1 wt % to 19 wt %, or about 1 wt % to 18 wt %, or about 1 wt % to 17 wt %, or about 1 wt % to 16 wt %, or about 1 wt % to 15 wt %, or about 5 wt % to 20 wt %, or about 10 wt % to 20 wt % based on the total weight of a concentrate.

Suitable corrosion inhibitors include sulfur-functional compounds such as mercaptoethanol, or tertiary amino compounds such as triazine as well as other mercapto and tertiary amino functionalized compounds and polymers. Suitable scale inhibitors include phosphonate compounds and acrylated polymers. In some embodiments, one or more such additives are present in an amount that is less than 1 percent by weight of a concentrate. In other embodiments, each one or more additives are present at about 1 ppm to 500 ppm in a injectate, for example about 2 ppm to 400 ppm, or about 3 ppm to 300 ppm, or about 4 ppm to 200 ppm, or about 5 ppm to 100 ppm of one or more additives.

Methods

The following descriptions of the methodology include descriptions of individual actions, wherein any of the individual actions are intended to be combined with any other individual actions without limitation except where specified otherwise. Further, the methods as described below are intended to be combined with the use of any of the foregoing compositions, without limitation except where specifically limited or limited by context.

Herein there is provided a method of making any of the concentrate compositions described herein.

In embodiments, the components of the composition are combined in any order and using any method known to those of skill in forming admixtures. Concentrates are suitably formed by combining the components of the compositions described above in any order to result in a concentrate having about 5 wt % to 90 wt % surfactant content. In some embodiments, one or more additional components are added to the concentrate, or to the injectate for purposes of hydraulic fracturing. Such additional components (additives) include any of those recited above. The dilution of the concentrate to form the injectate or fracturing fluid is accomplished using a water source; in some embodiments the water source comprises, consists essentially of, or consists of produced water and/or seawater.

In embodiments, there is provided herein a method of making an injectate, the method comprising, consisting of, or consisting essentially of combining any one of the concentrates described herein with any one of the water sources herein to form an injectate having an interfacial tension of no more than 0.03 mN/m and a turbidity of no more than 800 NTU. In some such embodiments, the injectate has an interfacial tension of 0.0001 to 0.02 or 0.0001 to 0.01 mN/m and a turbidity of 710 to 340 NTU.

In embodiments, there is provided a method of making an injectate having a turbidity of 800 NTU or less, the method comprising, consisting of, or consisting essentially of combining any one of the concentrates described herein with any one of the water sources described herein to provide an injectate, wherein the one or more hydrotropes in the injectate contributes an increase in interfacial tension of the injectate of no more than 0.0235 mN/m as compared with a corresponding injectate lacking the one or more hydrotropes.

There is provided a method of enhanced oil recovery, the method comprising, consisting of, or consisting essentially of (a) introducing any one of the injectate compositions disclosed herein to a subterranean hydrocarbon formation, and recovering a hydrocarbon from the subterranean oil formation. In embodiments, the hydrocarbon comprises, consists of, or consists essentially of crude oil. In embodiments, the temperature of at least part of the subterranean oil formation is about 60° C. to about 120° C.

In some embodiments, the concentrate is combined with a water source and any desired additives to produce an injectate contemporaneously with one or more subterranean injection processes; in other embodiments the combining is prior to injecting. The injectate is injected via a well into a subterranean hydrocarbon-containing formation, where it results in increased rate, overall yield, or both of hydrocarbon compounds collected or recovered from the formation. In some embodiments, the water source, the subterranean environment, or both are high temperature, include high total dissolved solids, or both. In embodiments the subterranean reservoir includes tight rock, very tight rock, heavy oil, high paraffin content, or a combination of two or more thereof.

Injection of the injectates results in increased rate of recovery, total yield of hydrocarbon compounds, or both obtained from a subterranean reservoir. In some embodiments, the reservoir is a tight shale reservoir, a sandstone reservoir, or a carbonate reservoir. In embodiments, the reservoir is characterized by one or more of the following: tight rock, very tight rock, low permeability, low porosity, high temperature, high total dissolved solids in a subterranean water source, and high divalent cation content of a subterranean water source. Where the injecting is contemporaneous with hydraulic fracturing, the injectate includes a proppant as an additive and is referred to as a fracturing fluid.

In embodiments, the injectates are formed by combining a concentrate (optionally after a storage period) with a water source. In embodiments the produced water includes high total dissolved solids. The injectates thus formed are stable mixtures and do not phase separate.

We have found that unexpectedly, the inclusion of particular hydrotropes in concentrates increases compatibility between surfactants and high total dissolved water sources as judged by turbidity, i.e. decreases turbidity in injectates.

Accordingly, a method comprises, consists essentially of, or consists of forming any of the aforementioned concentrates, storing the concentrate for a period of about 1 day to two years, diluting the concentrate with a water source to form an injectate, and injecting the injectate into a subterranean reservoir. In embodiments the water source comprises, consists of, or consists essentially of a produced water, seawater, or a combination thereof. In embodiments the subterranean reservoir includes one or more of: high temperature, high pressure, high total dissolved solids water sources, tight rock, very tight rock, heavy oil, and hydrocarbon having high paraffin content.

In embodiments, the injectate is disposed within the subterranean reservoir for at least 7 to 90 days. Another method includes injecting an injectate into a first well which is in fluid connection with a subterranean hydrocarbon-containing formation, followed by collecting one or more hydrocarbon compounds from the first well. Yet another method includes injecting an injectate into a first well which is in fluid connection with a subterranean hydrocarbon-containing formation, followed by collecting one or more hydrocarbon compounds from a second well, wherein the second well is also fluidly connected to the subterranean hydrocarbon-containing formation. In embodiments, one or more such wells are wellbores—that is, man-made fluid connections to a subterranean reservoir that is further adapted to collect the hydrocarbon.

In some embodiments, after about 1 second of contact with rock previously soaked in hydrocarbon compounds, contact angle of a drop of an injectate applied to the surface of the rock is observed to be 70° or less, such as about 5° to 70°, or about 10° to 70°, or about 20° to 70°, or about 30° to 70°, or about 40° to 70°, or about 5° to 65°, or about 5° to 60°, or about 5° to 55°, or about 5° to 50°, or about 5° to 45°, or about 10° to 60°, or about 10° to 50°, or about 20° to 50°, or about 30° to 50°. In some embodiments, after about 10 seconds of contact with rock previously soaked in hydrocarbon compounds, contact angle of a drop of an injectate applied to the surface of the rock is observed to be 50° or less, such as about 5° to 50°, or about 10° to 50°, or about 20° to 50°, or about 30° to 50°, or about 5° to 45°, or about 5° to 40°, or about 5° to 35°, or about 10° to 35°, or about 10° to 30°, or about 20° to 40°, or about 25° to 40°. In some embodiments, after about 60 second of contact with rock previously soaked in hydrocarbon compounds, contact angle of a drop of an injectate applied to the surface of the rock is observed to be 40° or less, such as about 5° to 40°, or about 7° to 40°, or about 10° to 40°, or about 15° to 40°, or about 20° to 40°, or about 5° to 35°, or about 5° to 30°, or about 5° to 25°, or about 5° to 20°, or about 7° to 30°, or about 7° to 25°, or about 10° to 25°.

In some embodiments, the injecting of the injectate is carried out after hydraulic fracturing of the reservoir. In some cases, the injectate is injected into a reservoir wherein no hydraulic fracturing has been carried out. In other embodiments, injecting of the injectate is carried out contemporaneously with hydraulic fracturing of the reservoir. The methods of the invention are particularly useful in secondary and tertiary oil recovery, collectively referred to herein as enhanced oil recovery, which is any injection carried out after the fluid connection of a well is already established.

The compositions of the invention are also suitably employed for enhanced oil recovery in one or more steam assisted gravity drainage (SAGD) processes. SAGD is an enhanced oil recovery technology for producing heavy crude oil and bitumen. It is an advanced form of steam stimulation in which a pair of parallel horizontal wells is drilled into a subterranean reservoir, one a few meters above the other. High pressure steam is continuously injected into the upper wellbore to heat the oil and reduce its viscosity, causing the heated oil to drain into the lower wellbore, where it is pumped out. In such processes, the injectates of the invention are usefully injected along with the steam to affect subterranean wettability, surface tension, and the like.

Provided herein is a method of forming an injectate, the method comprising combining any one of the concentrates disclosed herein with any one of the water sources disclosed herein to form the injectate. In embodiments, the water source has a temperature of about 60° C. to about 120° C.

Further Description of Some Embodiments

The following are some embodiments contemplated by the present disclosure:

Embodiment 1: A concentrate for enhanced oil recovery, the concentrate comprising (i) one or more sulfonated and/or sulfated surfactants; (ii) one or more alkoxylated alcohol surfactants; (iii) one or more coupling agents; (iv) one or more hydrotropes; (v) one or more additional surfactants selected from anionic surfactants, cationic surfactants, nonionic surfactants, zwitterionic surfactants, and any combination thereof; and (vi) water.

Embodiment 2. The concentrate of Embodiment 1, wherein the hydrotrope is selected from aryl sulfonates, aryl phosphates, and a combination thereof.

Embodiment 3. The concentrate of Embodiment 1 or Embodiment 2, wherein the one or more alkoxylated alcohol surfactants comprises, consists of, or consists essentially of an alkoxylated carboxylated surfactant.

Embodiment 4. The concentrate of Embodiment 3, wherein the alkoxylated carboxylated surfactant has the formula $R^1$—O—$(R^2O)$m-$(CH_2)$—$CO_2X$, wherein $R^1$ is a C10 to C20 alkyl group, $R^2$ is a C1 to C4 alkylene group, m is 1 to 10, and X is hydrogen or an alkali metal.

Embodiment 5. The concentrate of Embodiment 4, wherein the one or more alkoxylated alcohol surfactants consists essentially of the alkoxylated carboxylated surfactant.

Embodiment 6. The concentrate of Embodiment 4 or Embodiment 5, wherein $R^1$ is tridecyl, $R^2$ is $CH_2CH_2$, and m is 3.

Embodiment 7. The concentrate of any one of Embodiments 1-6, wherein the one or more sulfonated and/or sulfated surfactants comprises, consists of, or consists essentially of a C15 to C18 internal olefin sulfonate.

Embodiment 8. The concentrate of any one of Embodiments 1-7, wherein the hydrotrope is selected from alkyl-substituted aryl sulfonates, alkyl-substituted aryl phosphates, and a combination thereof.

Embodiment 9. The concentrate of any one of Embodiments 1-8, wherein the hydrotrope comprises, consists of, or consists essentially of xylene sulfonate, toluene phosphate, or a combination thereof.

Embodiment 10. The concentrate of any one of Embodiments 1-9, wherein the one or more hydrotropes consists essentially of a sodium xylene sulfonate, potassium toluene phosphate, or a combination thereof.

Embodiment 11. The concentrate of any one of Embodiments 1-10, wherein the one or more hydrotropes consists essentially of sodium xylene sulfonate, and the concentrate comprises, consists of, or consists essentially of about 0.1 to 0.25 moles of the sodium xylene sulfonate per 1000 grams of the concentrate.

Embodiment 12. The concentrate of any one of Embodiments 1-11, wherein the one or more hydrotropes consists essentially of sodium xylene sulfonate, and the molar ratio of the one or more coupling agents to the sodium xylene sulfonate is from about 2 to 1 to about 10 to 1.

Embodiment 13. The concentrate of any one of Embodiments 1-12, wherein the one or more hydrotropes consists essentially of sodium xylene sulfonate, and the ratio of the weight of the sodium xylene sulfonate to the combined weight of the one or more sulfonated and/or sulfated surfactants, the one or more alkoxylated alcohol surfactants, and the one or more additional surfactants in the concentrate is about 0.09:1 to about 0.19:1.

Embodiment 14. The concentrate of any one of Embodiments 1-10, wherein the one or more hydrotropes consists essentially of potassium toluene phosphate, and the concentrate comprises, consists of, or consists essentially of about 0.05 to 0.30 moles of the potassium toluene phosphate per 1000 grams of the concentrate.

Embodiment 15. The concentrate of any one of Embodiments 1-10 and 14, wherein the one or more hydrotropes consists essentially of potassium toluene phosphate, and the molar ratio of the one or more coupling agents to the potassium toluene phosphate is about 1:1 to about 25:1.

Embodiment 16. The concentrate of any one of Embodiments 1-10 and 14-15, wherein the one or more hydrotropes consists essentially of potassium toluene phosphate, and the ratio in the concentrate of the weight of the potassium toluene phosphate to the combined weight of the one or more sulfonated and/or sulfated surfactants, the one or more alkoxylated alcohol surfactants, and the one or more additional surfactants in the concentrate is about 0.05:1 to about 0.19:1.

Embodiment 17. The concentrate of any one of Embodiments 1-16, wherein the one or more additional surfactants comprises, consists of, or consists essentially of one or more zwitterionic surfactants.

Embodiment 18. The concentrate of any one of Embodiments 1-17, wherein the one or more additional surfactants comprises, consists of, or consists essentially of betaines, sultaines, alkyl amine oxides, alkyl amphoacetates, alkylamphopropionates, alkyliminodipropionate, or any combination thereof.

Embodiment 19. The concentrate of any one of Embodiments 1-18, wherein the one or more additional surfactants comprises, consists of, or consists essentially of cocoamidopropyl betaine, cocodimethyl betaine, N,N-dimethyl hexadecaneamine N-oxide, cocodimethyl amine oxide, cocoamidopropyl hydroxy sultaine, lauryl hydroxysultaine, lauryl betaine, or any combination thereof.

Embodiment 20. The concentrate of any one of Embodiments 1-19, wherein the one or more coupling agents is selected from the group consisting of alcohols having 1-6 carbon atoms and alkyl ethers of alkylene glycols, wherein the alkyl of the alkyl ether has 1-6 carbon atoms.

Embodiment 21. The concentrate of any one of Embodiments 1-20, wherein the coupling agent is ethylene glycol monobutyl ether.

Embodiment 22. The concentrate of any one of Embodiments 1-21, wherein the total concentration of the one or more sulfonated and/or sulfated surfactants is 5 wt % to 15 wt % of the concentrate.

Embodiment 23. The concentrate of any one of Embodiments 1-22, wherein the total concentration of the one or more alkoxylated alcohol surfactants is 1 wt % to 5 wt % of the concentrate.

Embodiment 24. The concentrate of any one of Embodiments 1-23, wherein the concentration of the one or more additional surfactants is 5 wt % to 15 wt % of the concentrate.

Embodiment 25. The concentrate of any one of Embodiments 1-24, wherein the concentration of the one or more coupling agents is 5 wt % to 15 wt % of the concentrate.

Embodiment 26. The concentrate of any one of Embodiments 1-25, wherein the concentrate comprises 56 wt % to 63 wt % of water.

Embodiment 27. The concentrate of any one of Embodiments 1-26, wherein the concentrate excludes any compound having a molecular weight and/or a number average molecular weight of greater than 1000 daltons and/or excludes any synthetic organic polymer.

Embodiment 28. The concentrate of any one of Embodiments 1-27, wherein the concentrate excludes any compound having a molecular weight and/or number average molecular weight of 1000 daltons to 100000000 daltons and/or excludes any synthetic organic polymer.

Embodiment 29. An injectate composition comprising the concentrate of any one of Embodiments 1-28 and a water source, wherein the water source is selected from seawater, produced water, tap water, distilled water, deionized water, brine, and any combination thereof.

Embodiment 30. The injectate composition of Embodiment 29, wherein the total concentration of surfactants in the injectate composition is about 0.001 wt % to about 2 wt % of the injectate composition.

Embodiment 31. The injectate composition of Embodiment 29 or Embodiment 30, wherein the total concentration of surfactants in the injectate composition is 1.06 to 1.18 wt % of the injectate composition.

Embodiment 32. The injectate composition of any one of Embodiments 29-31, wherein the turbidity of the injectate composition is less than or equal to 800 NTU.

Embodiment 33. The injectate composition of any one of Embodiments 29-32, wherein the turbidity of the injectate composition is 300 to 800 NTU.

Embodiment 34. The injectate composition of any one of Embodiments 29-33, wherein the interfacial tension of the injectate composition is less than 0.04 mN/m.

Embodiment 35. The injectate composition of any one of Embodiments 29-34, wherein the interfacial tension of the injectate composition is 0.0065 to 0.03 mN/m.

Embodiment 36. The injectate composition of any one of Embodiments 29-35, wherein the water source comprises 5 wt % to 35 wt % total dissolved solids.

Embodiment 37. The injectate composition of any one of Embodiments 29-36, wherein the water source comprises 2.0 to 2.5 wt % sodium chloride.

Embodiment 38. The injectate composition of any one of Embodiments 29-35, wherein the water source comprises by weight about 1,000 ppm to about 100,000 ppm of $Na^+$, 100 ppm to about 20,000 ppm of $Ca^{2+}$, about 500 to about 2,500 ppm of $Mg^{2+}$, about 10,000 to about 200,000 ppm of $Cl^-$, or any combination thereof.

Embodiment 39. The injectate composition of any one of Embodiments 29-35, wherein the water source comprises by weight about 10,000 to about 12,000 ppm of $Na^+$, about 1,300 to about 1,400 ppm $Mg^{2+}$, about 400 ppm to about 450 ppm $Ca^{2+}$, about 19,000 to about 20,000 ppm $Cl^-$, about 2,900 to about 3,000 ppm of $S_4^{2-}$, about 5 ppm to about 10 ppm $HCO_3^-$, or any combination thereof.

Embodiment 40. The injectate composition of any one of Embodiments 29-39, wherein the injectate composition excludes any compound having a molecular weight and/or a number average molecular weight of greater than 1000 daltons.

Embodiment 41. The injectate composition of any one of Embodiments 29-40, wherein the injectate composition excludes any compound having a molecular weight and/or a number average molecular weight of 1000 to 100000000.

Embodiment 42. A method of enhanced oil recovery, the method comprising: (a) introducing the injectate composition of any one of Embodiments 29-41 into a subterranean oil formation; and (b) recovering a hydrocarbon from the subterranean oil formation.

Embodiment 43. The method of Embodiment 42, wherein at least part of the subterranean oil formation is at a temperature of about 60° C. to about 120° C.

Embodiment 44. A method of forming an injectate, the method comprising: combining the concentrate of any one of Embodiments 1-28 with a water source to form the injectate composition of any one of Embodiments 29 to 41.

Embodiment 45. The method of Embodiment 44, wherein the water source has a temperature of about 60° C. to about 120° C.

Embodiment 46: A concentrate for enhanced oil recovery, the concentrate comprising, consisting of, or consisting essentially of (i) a sulfonated or a sulfated surfactant; (ii) an alkoxylated alcohol surfactant; (iii) a coupling agent; (iv) a hydrotrope; (v) an additional surfactant selected from anionic surfactants, cationic surfactants, nonionic surfactants, and zwitterionic surfactants; and (vi) water.

Embodiment 47. The concentrate of Embodiment 46, wherein the hydrotrope is selected from aryl sulfonates, aryl phosphates, and a combination thereof.

Embodiment 48. The concentrate of Embodiment 46 or Embodiment 47, wherein the alkoxylated alcohol surfactants is an alkoxylated carboxylated surfactant.

Embodiment 49. The concentrate of Embodiment 48, wherein the alkoxylated carboxylated surfactant has the formula $R^1$—O—$(R^2O)m$-$(CH_2)$—$CO_2X$, wherein $R^1$ is a C10 to C20 alkyl group, $R^2$ is a C1 to C4 alkylene group, m is 1 to 10, and X is hydrogen or an alkali metal.

Embodiment 50. The concentrate of Embodiment 49, wherein the concentrate does not include an alkoxylated alcohol surfactant except for the alkoxylated carboxylated surfactant.

Embodiment 51. The concentrate of Embodiment 49 or Embodiment 50, wherein $R^1$ is tridecyl, $R^2$ is $CH_2CH_2$, and m is 3.

Embodiment 52. The concentrate of any one of Embodiments 46-51, wherein the concentrate comprises a C15 to C18 internal olefin sulfonate.

Embodiment 53. The concentrate of any one of Embodiments 46-52, wherein the hydrotrope is selected from alkyl-substituted aryl sulfonates and alkyl-substituted aryl phosphates.

Embodiment 54. The concentrate of any one of Embodiments 46-53, wherein the hydrotrope is xylene sulfonate or toluene phosphate.

Embodiment 55. The concentrate of any one of Embodiments 54, wherein the concentrate excludes any hydrotrope except for the xylene sulfonate or the toluene phosphate.

Embodiment 56. The concentrate of any one of Embodiments 46-55, wherein the concentrate comprises about 0.1 to 0.25 moles of the sodium xylene sulfonate per 1000 grams of the concentrate.

Embodiment 57. The concentrate of any one of Embodiments 46-56, wherein the concentrate comprises sodium xylene sulfonate, and the molar ratio of the coupling agent to the sodium xylene sulfonate is from about 2 to 1 to about 10 to 1.

Embodiment 58. The concentrate of any one of Embodiments 46-57, wherein the concentrate comprises sodium xylene sulfonate, and the ratio of the weight of the sodium xylene sulfonate to the combined weight of the sulfonated or sulfated surfactant, the alkoxylated alcohol surfactant, and the additional surfactant in the concentrate is about 0.09:1 to about 0.19:1.

Embodiment 59. The concentrate of any one of Embodiments 46-55, wherein the concentrate comprises 0.05 to 0.30 moles of the potassium toluene phosphate per 1000 grams of the concentrate.

Embodiment 60. The concentrate of any one of Embodiments 46-55 and 59, wherein the hydrotrope is potassium toluene phosphate, and the molar ratio of the one or more coupling agents to the potassium toluene phosphate is about 1:1 to about 25:1.

Embodiment 61. The concentrate of any one of Embodiments 46-55 and 59-60, wherein the hydrotrope is potassium toluene phosphate, and the ratio in the concentrate of the weight of the potassium toluene phosphate to the combined weight of the sulfonated or sulfated surfactant, the alkoxylated alcohol surfactant, and the additional surfactant in the concentrate is about 0.05:1 to about 0.19:1.

Embodiment 62. The concentrate of any one of Embodiments 46-61, wherein the additional surfactant is a zwitterionic surfactant.

Embodiment 63. The concentrate of any one of Embodiments 46-62, wherein the additional surfactant is selected from betaines, sultaines, alkyl amine oxides, alkyl amphoacetates, alkylamphopropionates, and alkyliminodipropionate.

Embodiment 64. The concentrate of any one of Embodiments 46-63, wherein the additional surfactant is selected from cocoamidopropyl betaine, cocodimethyl betaine, N,N- dimethyl hexadecaneamine N-oxide, cocodimethyl amine oxide, cocoamidopropyl hydroxy sultaine, lauryl hydroxysultaine, and lauryl betaine.

Embodiment 65. The concentrate of any one of Embodiments 46-64, wherein the coupling agent is selected from the group consisting of alcohols having 1-6 carbon atoms and alkyl ethers of alkylene glycols, wherein the alkyl of the alkyl ether has 1-6 carbon atoms.

Embodiment 66. The concentrate of any one of Embodiments 46-65, wherein the coupling agent is ethylene glycol monobutyl ether.

Embodiment 67. The concentrate of any one of Embodiments 46-66, wherein the concentration of the sulfonated or sulfated surfactant is 5 wt % to 15 wt % of the concentrate.

Embodiment 68. The concentrate of any one of Embodiments 46-67, wherein the concentration of the alkoxylated alcohol surfactant is 1 wt % to 5 wt % of the concentrate.

Embodiment 69. The concentrate of any one of Embodiments 46-68, wherein the concentration of the additional surfactant is 5 wt % to 15 wt % of the concentrate.

Embodiment 70. The concentrate of any one of Embodiments 46-69, wherein the concentration of the coupling agent is 5 wt % to 15 wt % of the concentrate.

Embodiment 71. The concentrate of any one of Embodiments 46-70, wherein the concentrate comprises 56 wt % to 63 wt % of water.

Embodiment 72. The concentrate of any one of Embodiments 46-71, wherein the concentrate excludes any compound having a number average molecular weight of greater than 1000 daltons.

Embodiment 73. The concentrate of any one of Embodiments 46-72, wherein the concentrate excludes any compound having a number average molecular weight of 1000 daltons to 100000000 daltons.

Embodiment 74. An injectate composition comprising, consisting of, or consisting essentially of the concentrate of any one of Embodiments 46-73 and a water source, wherein the water source is selected from seawater, produced water, tap water, distilled water, deionized water, brine, and any combination thereof.

Embodiment 75. The injectate composition of Embodiment 74, wherein the total concentration of surfactants in the injectate composition is about 0.001 wt % to about 2 wt % of the injectate composition.

Embodiment 76. The injectate composition of Embodiment 74 or Embodiment 75, wherein the total concentration of surfactants in the injectate composition is 1.06 to 1.18 wt % of the injectate composition.

Embodiment 77. The injectate composition of any one of Embodiments 74-76, wherein the turbidity of the injectate composition is less than or equal to 800 NTU.

Embodiment 78. The injectate composition of any one of Embodiments 74-77, wherein the turbidity of the injectate composition is 300 to 800 NTU.

Embodiment 79. The injectate composition of any one of Embodiments 74-78, wherein the interfacial tension of the injectate composition is less than 0.04 mN/m.

Embodiment 80. The injectate composition of any one of Embodiments 74-79, wherein the interfacial tension of the injectate composition is 0.0065 to 0.03 mN/m.

Embodiment 81. The injectate composition of any one of Embodiments 74-80, wherein the water source comprises 5 wt % to 35 wt % total dissolved solids.

Embodiment 82. The injectate composition of any one of Embodiments 74-81, wherein the water source comprises 2.0 to 2.5 wt % sodium chloride.

Embodiment 83. The injectate composition of any one of Embodiments 74-82, wherein the water source comprises by weight about 1,000 ppm to about 100,000 ppm of $Na^+$, 100 ppm to about 20,000 ppm of $Ca^{2+}$, about 500 to about 2,500 ppm of $Mg^{2+}$, about 10,000 to about 200,000 ppm of $Cl^-$, or any combination thereof.

Embodiment 84. The injectate composition of any one of Embodiments 74-83, wherein the water source comprises by weight about 10,000 to about 12,000 ppm of $Na^+$, about 1,300 to about 1,400 ppm $Mg^{2+}$, about 400 ppm to about 450 ppm $Ca^{2+}$, about 19,000 to about 20,000 ppm $Cl^-$, about 2,900 to about 3,000 ppm of $SO_4^{2-}$, about 5 ppm to about 10 ppm $HCO_3^-$, or any combination thereof.

Embodiment 85. The injectate composition of any one of Embodiments 74-84, wherein the injectate composition excludes any compound having a number average molecular weight of greater than 1000 daltons.

Embodiment 86. The injectate composition of any one of Embodiments 74-85, wherein the injectate composition excludes any compound having a number average molecular weight of 1000 to 100000000 daltons.

Embodiment 87. A method of enhanced oil recovery, the method comprising: (a) introducing the injectate composition of any one of Embodiments 74-86 into a subterranean oil formation; and (b) recovering a hydrocarbon from the subterranean oil formation.

Embodiment 88. The method of Embodiment 87, wherein at least part of the subterranean oil formation is at a temperature of about 60° C. to about 120° C.

Embodiment 89. A method of forming an injectate, the method comprising: combining the concentrate of any one of Embodiments 46-73 with a water source to form the injectate composition of any one of Embodiments 74-86.

Embodiment 90. The method of Embodiment 89, wherein the water source has a temperature of about 60° C. to about 120° C.

Having described the invention in detail, it will be apparent that modifications and variations are possible without departing from the scope of the invention defined in the appended claims. The following non-limiting examples are provided to further illustrate the present invention.

EXAMPLES

Example 1: Preparation of Concentrates

Concentrates were formulated comprising various hydrotropes as shown in TABLE 1.

TABLE 1

| | Concentrate components | | | | |
|---|---|---|---|---|---|
| Concentrate Formula | Hydrotrope formulation | Coupling agent | Zwitterionic surfactant(s) | Alkoxylated alcohol surfactant | Sulfonated anionic surfactant(s) |
| A | 40% aqueous sodium xylene sulfonate | ethylene glycol monobutyl ether | 30% active lauryl betaine, MACKAM ® | C13-alcohol polyethylene glycol ether carboxylic acid, | 30% active(s) C15-C18 internal |

TABLE 1-continued

| | | Concentrate components | | | |
|---|---|---|---|---|---|
| Concentrate Formula | Hydrotrope formulation | Coupling agent | Zwitterionic surfactant(s) | Alkoxylated alcohol surfactant | Sulfonated anionic surfactant(s) |
| B | 42% actives potassium toluene phosphate | | LAB | 90% active(s), MARLOWET ® 4538 | olefin sulfonate |
| C | T-MULZ ® 565, (100% active(s) nonylphenol mono- and diester of phosphoric acid) | | | | |
| D | 90% active(s) C21 dicarboxylic acid | | | | |

Each of Formulas A, B, C, and D was made up with various amounts of the components as shown in TABLE 2 to provide the compositions in TABLE 3.

TABLE 2

| | Concentrate formulations, weight percent of components | | | | |
|---|---|---|---|---|---|
| Composition number | Wt % hydrotrope formulation | Wt % EGMBE | Wt % MACKAM ® LAB | Wt % MARLOWET ® 4538 | Wt % of 30% active(s) C15-C18 internal olefin sulfonate |
| 1 | 0 | 19 | 38.89 | 3.11 | 39 |
| 2 | 3 | 16 | | | |
| 3 | 6 | 13 | | | |
| 4 | 9 | 10 | | | |
| 5 | 12 | 7 | | | |
| 6 | 15 | 4 | | | |
| 7 | 19 | 0 | | | |

EGMBE is ethylene glycol monobutyl ether.

Accordingly, the compositions comprised components as set forth in TABLE 3.

TABLE 3

| | Concentrate formulations | | | | | |
|---|---|---|---|---|---|---|
| Concentrate Formula/ Composition Number | Wt % hydrotrope active | Wt % EGMBE | Wt % lauryl betaine active(s) | Wt % alkoxylated alcohol surfactant active(s) | Wt % internal olefin sulfonate active(s) | Wt coupling agent/ weight hydrotrope active |
| A/1 | 0 | 19 | 11.67 | 2.8 | 11.7 | — |
| A/2 | 1.2 | 16 | 11.67 | 2.8 | 11.7 | 13.333 |
| A/3 | 2.4 | 13 | 11.67 | 2.8 | 11.7 | 5.417 |
| A/4 | 3.6 | 10 | 11.67 | 2.8 | 11.7 | 2.778 |
| A/5 | 4.8 | 7 | 11.67 | 2.8 | 11.7 | 1.458 |
| A/6 | 6.0 | 4 | 11.67 | 2.8 | 11.7 | 0.667 |
| A/7 | 7.6 | 0 | 11.67 | 2.8 | 11.7 | 0 |
| B/1 | 0 | 19 | 11.67 | 2.8 | 11.7 | — |
| B/2 | 1.26 | 16 | 11.67 | 2.8 | 11.7 | 12.698 |
| B/3 | 2.52 | 13 | 11.67 | 2.8 | 11.7 | 5.159 |
| B/4 | 3.78 | 10 | 11.67 | 2.8 | 11.7 | 2.646 |
| B/5 | 5.04 | 7 | 11.67 | 2.8 | 11.7 | 1.389 |
| B/6 | 6.30 | 4 | 11.67 | 2.8 | 11.7 | 0.635 |

TABLE 3-continued

Concentrate formulations

| Concentrate Formula/ Composition Number | Wt % hydrotrope active | Wt % EGMBE | Wt % lauryl betaine active(s) | Wt % alkoxylated alcohol surfactant active(s) | Wt % internal olefin sulfonate active(s) | Wt coupling agent/ weight hydrotrope active |
|---|---|---|---|---|---|---|
| B/7 | 7.98 | 0 | 11.67 | 2.8 | 11.7 | 0 |
| C/1 | 0 | 19 | 11.67 | 2.8 | 11.7 | — |
| C/2 | 3 | 16 | 11.67 | 2.8 | 11.7 | 5.333 |
| C/3 | 6 | 13 | 11.67 | 2.8 | 11.7 | 2.167 |
| C/4 | 9 | 10 | 11.67 | 2.8 | 11.7 | 1.111 |
| C/5 | 12 | 7 | 11.67 | 2.8 | 11.7 | 0.583 |
| C/6 | 15 | 4 | 11.67 | 2.8 | 11.7 | 0.267 |
| C/7 | 19 | 0 | 11.67 | 2.8 | 11.7 | 0 |
| D/1 | 0 | 19 | 11.67 | 2.8 | 11.7 | — |
| D/2 | 2.7 | 16 | 11.67 | 2.8 | 11.7 | 5.926 |
| D/3 | 5.4 | 13 | 11.67 | 2.8 | 11.7 | 2.407 |
| D/4 | 8.1 | 10 | 11.67 | 2.8 | 11.7 | 1.235 |
| D/5 | 10.8 | 7 | 11.67 | 2.8 | 11.7 | 0.648 |
| D/6 | 13.5 | 4 | 11.67 | 2.8 | 11.7 | 0.296 |
| D/7 | 17.1 | 0 | 11.67 | 2.8 | 11.7 | 0 |

Example 2: Preparation of Synthetic Seawater

A synthetic seawater was made according to the formulation of TABLE 4, by dissolving the sodium chloride, the magnesium chloride hexahydrate, the sodium sulfate, the calcium chloride dihydrate, and sodium hydrogen carbonate in deionized water and filtering through a 2.5 micron filter paper.

TABLE 4

Synthetic seawater

| Component | Wt % of component |
|---|---|
| NaCl | 2.465 |
| $MgCl_2 \cdot 6H_2O$ | 1.139 |
| $Na_2SO_4$ | 0.438 |
| $CaCl_2 \cdot 2H_2O$ | 0.157 |

TABLE 4-continued

Synthetic seawater

| Component | Wt % of component |
|---|---|
| $NaHCO_3$ | 0.001 |
| Deionized water | 95.800 |

Example 3: Preparation of Injectates

Each of the formulations in TABLE 3 was made up with synthetic seawater made as in Example 2 to provide an injectate with 1.12 wt % of total surfactant actives (lauryl betaine, C13-alcohol polyethylene glycol ether carboxylic acid, and C15-C18 internal olefin sulfonate). Accordingly, 2,237 g of synthetic seawater was added per 100 g of concentrate to make 2,337 g of each injectate, the injectates having the compositions shown in TABLE 5.

TABLE 5

Injectate compositions

| Injectate | Hydrotrope | Wt % hydrotrope active | Wt % EGMBE | Wt % surfactant active(s) | Wt % salts from synthetic seawater | Balance/ water | Weight hydrotrope active/ weight surfactants |
|---|---|---|---|---|---|---|---|
| A1 | sodium | 0 | 0.813 | 1.12 | 4.02 | 94.05 | 0 |
| A2 | xylene | 0.051 | 0.685 | 1.12 | 4.02 | 94.12 | 0.046 |
| A3 | sulfonate | 0.10 | 0.556 | 1.12 | 4.02 | 94.20 | 0.089 |
| A4 |  | 0.15 | 0.428 | 1.12 | 4.02 | 94.28 | 0.134 |
| A5 |  | 0.21 | 0.300 | 1.12 | 4.02 | 94.35 | 0.188 |
| A6 |  | 0.26 | 0.171 | 1.12 | 4.02 | 94.43 | 0.232 |
| A7 |  | 0.33 | 0 | 1.12 | 4.02 | 94.53 | 0.295 |
| B1 | potassium | 0 | 0.813 | 1.12 | 4.02 | 94.05 | 0 |
| B2 | toluene | 0.054 | 0.685 | 1.12 | 4.02 | 94.12 | 0.048 |
| B3 | phosphate | 0.11 | 0.556 | 1.12 | 4.02 | 94.20 | 0.098 |
| B4 |  | 0.162 | 0.428 | 1.12 | 4.02 | 94.27 | 0.145 |
| B5 |  | 0.216 | 0.300 | 1.12 | 4.02 | 94.34 | 0.193 |
| B6 |  | 0.270 | 0.171 | 1.12 | 4.02 | 94.42 | 0.241 |
| B7 |  | 0.342 | 0 | 1.12 | 4.02 | 94.52 | 0.305 |
| C1 | phosphoric | 0 | 0.813 | 1.12 | 4.02 | 94.05 | 0 |
| C2 | acid esters | 0.13 | 0.685 | 1.12 | 4.02 | 94.05 | 0.116 |
| C3 |  | 0.26 | 0.556 | 1.12 | 4.02 | 94.05 | 0.232 |
| C4 |  | 0.39 | 0.428 | 1.12 | 4.02 | 94.05 | 0.348 |

TABLE 5-continued

Injectate compositions

| Injectate | Hydrotrope | Wt % hydrotrope active | Wt % EGMBE | Wt % surfactant active(s) | Wt % salts from synthetic seawater | Balance/ water | Weight hydrotrope active/ weight surfactants |
|---|---|---|---|---|---|---|---|
| C5 | | 0.51 | 0.300 | 1.12 | 4.02 | 94.05 | 0.455 |
| C6 | | 0.64 | 0.171 | 1.12 | 4.02 | 94.05 | 0.571 |
| C7 | | 0.81 | 0 | 1.12 | 4.02 | 94.05 | 0.723 |
| D1 | C21 | 0 | 0.813 | 1.12 | 4.02 | 94.05 | 0 |
| D2 | dicarboxylic | 0.12 | 0.685 | 1.12 | 4.02 | 94.06 | 0.107 |
| D3 | acid | 0.23 | 0.556 | 1.12 | 4.02 | 94.07 | 0.205 |
| D4 | | 0.35 | 0.428 | 1.12 | 4.02 | 94.09 | 0.313 |
| D5 | | 0.46 | 0.300 | 1.12 | 4.02 | 94.10 | 0.411 |
| D6 | | 0.578 | 0.171 | 1.12 | 4.02 | 94.11 | 0.516 |
| D7 | | 0.732 | 0 | 1.12 | 4.02 | 94.13 | 0.654 |

Example 4: Injectate Measurements

The interfacial tension of each of the injectate formulations in TABLE 5 was measured by the pendant drop method using a RAMÉ-HART Model 295 goniometer and plotted against weight % hydrotrope actives in the injectate.

The turbidity of each of the injectate formulations was measured by turbidimeter (nephelometer). The results are given in TABLE 6.

TABLE 6

Interfacial tensions and turbidities of injectates

| Injectate | Hydrotrope | Wt % hydrotrope active | Interfacial tension (IFT) | Turbidity/ NTU |
|---|---|---|---|---|
| A1 | sodium | 0 | 0.0065 | >1000 |
| A2 | xylene | 0.051 | 0.0073 | >1000 |
| A3 | sulfonate | 0.10 | 0.007 | 790 |
| A4 | | 0.15 | 0.0085 | 709 |
| A5 | | 0.21 | 0.03 | 507 |
| A6 | | 0.26 | 0.045 | 483 |
| A7 | | 0.33 | 0.05 | 438 |
| B1 | potassium | 0 | 0.0065 | >1000 |
| B2 | toluene | 0.054 | 0.07 | 514 |
| B3 | phosphate | 0.11 | 0.015 | 440 |
| B4 | | 0.162 | 0.02 | 373 |
| B5 | | 0.216 | 0.015 | 346 |
| B6 | | 0.270 | 0.03 | 341 |
| B7 | | 0.342 | 0.065 | 340 |
| C1 | phosphoric | 0 | 0.0065 | >1000 |
| C2 | acid esters | 0.13 | 0.07 | >1000 |
| C3 | | 0.26 | 0.15 | >1000 |
| C4 | | 0.39 | 0.12 | >1000 |
| C5 | | 0.51 | Concentrate excessively viscous | |
| C6 | | 0.64 | | |
| C7 | | 0.81 | | |
| D1 | C21 | 0 | 0.0065 | >1000 |
| D2 | dicarboxylic | 0.12 | 0.018 | >1000 |
| D3 | acid | 0.23 | 0.07 | >1000 |
| D4 | | 0.35 | 0.16 | >1000 |
| D5 | | 0.46 | Concentrate excessively viscous | |
| D6 | | 0.578 | | |
| D7 | | 0.732 | | |

Acceptable interfacial tensions for injectates were considered to be 0.03 mN/m or less, with most preferred 0.01 mN/m or less.

The maximum turbidity that could be measured was 1000 NTU. Turbidity is a measure of the compatibility of the surfactants with the seawater water source. Greater turbidity corresponds with undesirably lower compatibility of the surfactant actives with the seawater water source. Compatibility was considered acceptable when the turbidity was about 800 or less, with most preferred 750 or less. The results for interfacial tension of the injectate versus wt % hydrotrope actives in the injectate are plotted in FIG. 1; and the results of turbidity of the injectate versus wt % hydrotrope actives in the injectate are plotted in FIG. 2. In FIG. 2, if the turbidity exceeded 1000 NTU, the turbidity was plotted at the 1000 NTU cutoff.

Figure 2:
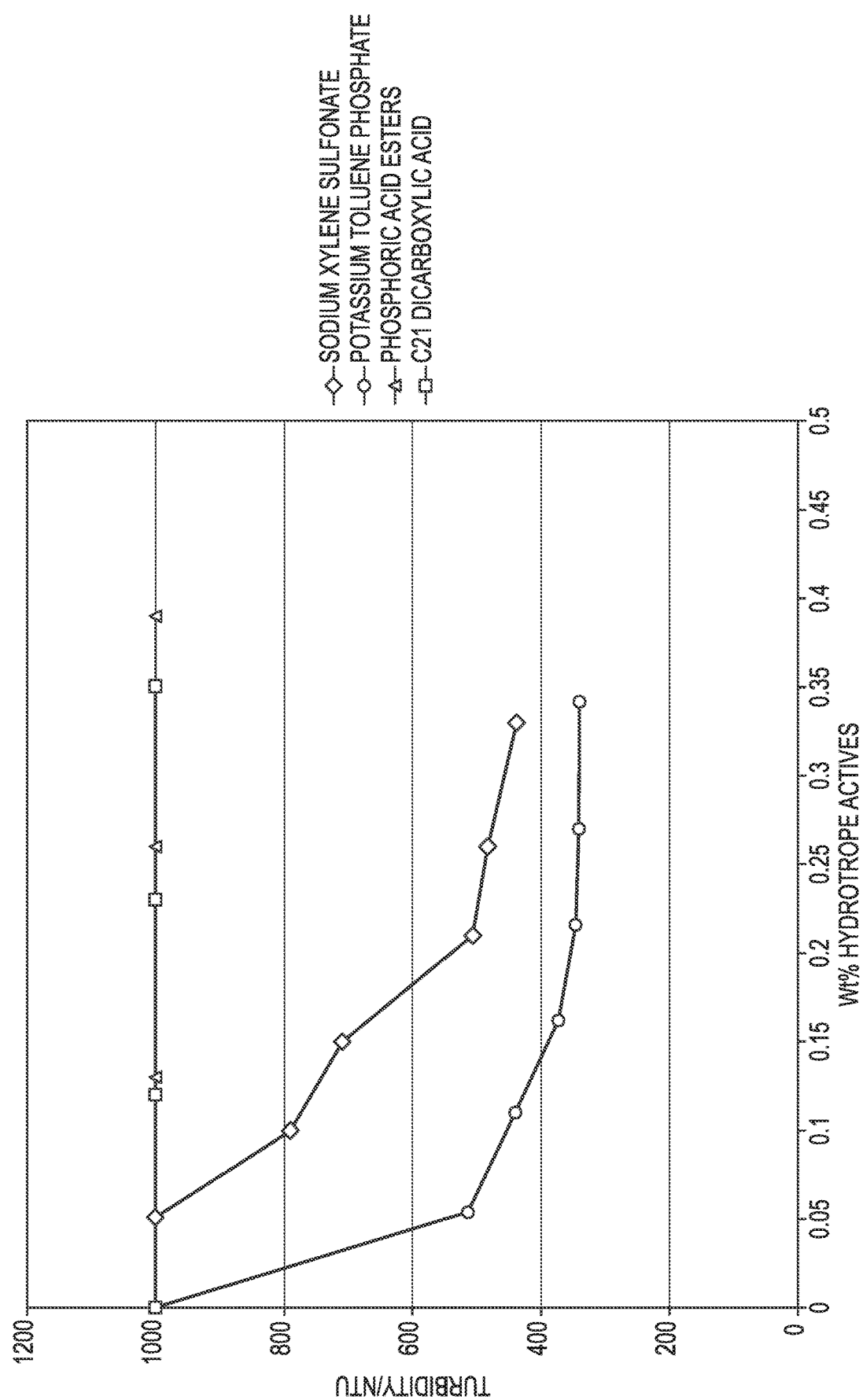
FIG. 2 is a plot of the turbidity of four injectates versus the weight percent of hydrotrope in each injectate.

As can be seen from the results in FIG. 1 and TABLE 6, in general the greater the amount of hydrotrope, the greater the interfacial tension. Accordingly, it is desirable to select the hydrotrope for inclusion in the concentrate to provide the lowest increases in interfacial tension for the amount of hydrotrope included. Sodium xylene sulfonate and potassium toluene phosphate (TRITON® H66) exhibited the lowest increases in interfacial tension at a given weight % (wt %) included in the concentrate; whereas the phosphoric acid esters hydrotrope (T-MULZ® 565) and the C21 Westvaco dicarboxylic acid hydrotrope exhibited the greatest increases in interfacial tension at a given wt %.

Further, as can be seen in FIG. 2 and TABLE 6, the lowest turbidity per weight of hydrotrope included were attained with potassium toluene phosphate followed by sodium xylene sulfonate. Inclusion of the phosphoric acid esters T-MULZ 565 and inclusion of the C21 Westvaco diacid over the experimented range did not decrease measured turbidity below 1000 NTU. However, very slight decreases in turbidity were observed by eye, the greater the amount of hydrotrope was added.

Example 5: Interfacial Tension (IFT) and Salinity

Further tests were run using concentrate A/4 (made as described in Example 1, formulation in TABLE 3).

Synthetic formation water and deionized water were combined together as appropriate to make series of synthetic water sources comprising 0 wt %, 25 wt %, 50 wt %, 75 wt % and 100 wt % of formation water.

The synthetic formation water was a solution of sodium chloride (10.683 wt %), magnesium chloride hexahydrate (1.171 wt %), sodium sulfate (0.414%), and calcium chloride dihydrate (0.147 wt %) in deionized water (87.585 wt %).

Concentrate A/4 was diluted with each of the synthetic water sources (dilutions of formation water) in a ratio of 100 g of concentrate A/4 to 2,237 g of each water source to make the series of injectates E1-E5 comprising 1.12% surfactant actives and having formulations as shown in TABLE 7.

TABLE 7

Injectates E1-E5

| Injectate | Wt % Concentrate A/4 | Wt % water source | Wt % formation water in water source | Wt % deionized water in water source |
|---|---|---|---|---|
| E1 | 4.28 | 95.72 | 0 | 100 |
| E2 | | | 25 | 75 |
| E3 | | | 50 | 50 |
| E4 | | | 75 | 25 |
| E5 | | | 100 | 0 |

Interfacial tension for each of injectates E1-E5 was measured by the pendant drop method using a GRACE INSTRUMENT® M6500 Spinning Drop Tensiometer, and interfacial tension versus weight % formation water in the water source was plotted. Additionally, samples of E1 and of E5 were incubated at 100° C. one week, and the interfacial tensions measured. The interfacial tension was plotted as a function of % formation water in the water source. The resulting plot is shown in FIG. 3.

Figure 3:
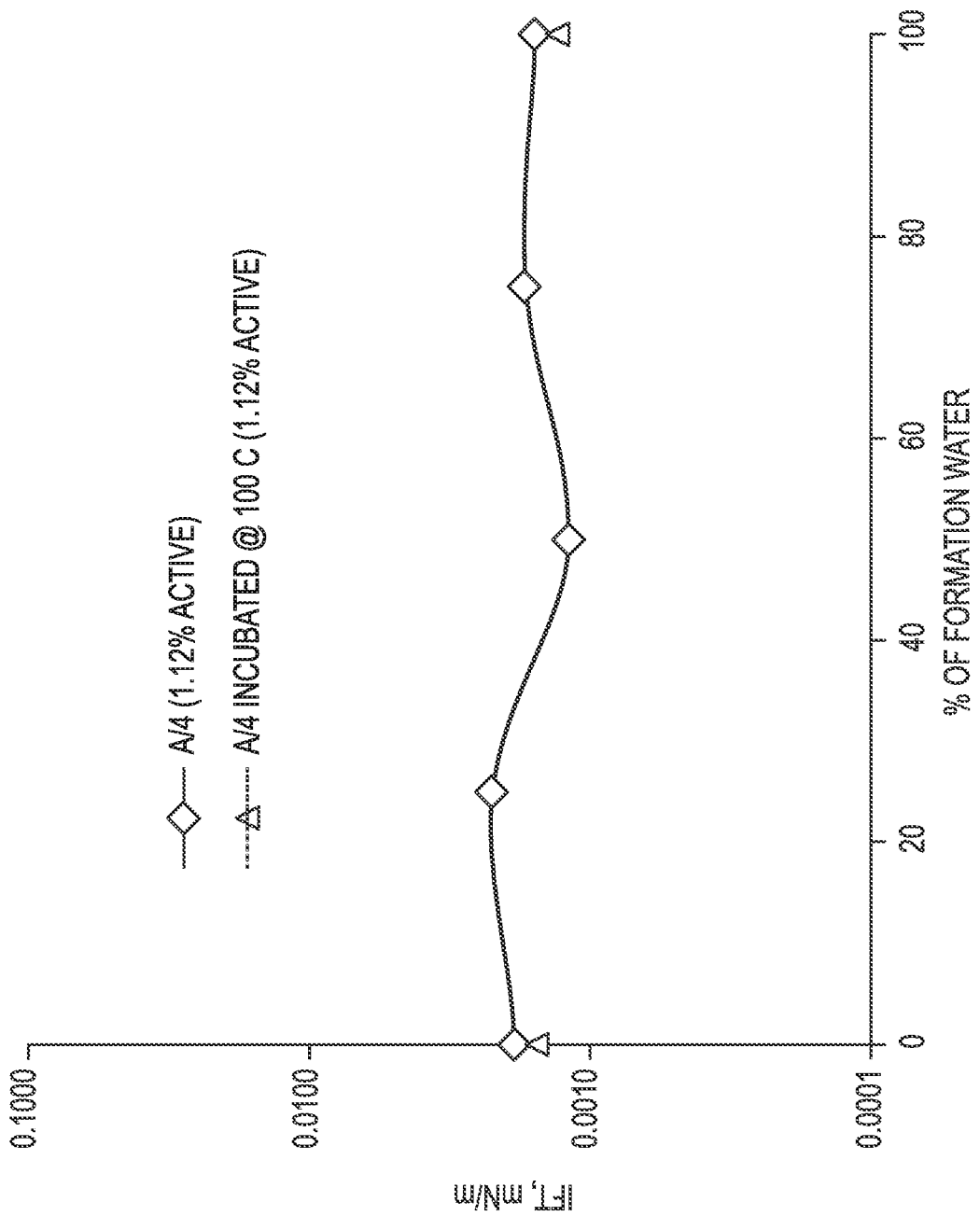
FIG. 3 is a plot of interfacial tension of an injectate versus weight percent of formation water in the injectate.

As can be seen in FIG. 3, the concentrate A/4 provides a low interfacial tension when mixed with water sources having a wide range of salinities with little variation over the wide range.

Example 6: Wetting of Oil-Saturated Cores at Various Salinities

Synthetic seawater was prepared as in Example 2. Three synthetic water samples were prepared using synthetic seawater prepared as in Example 2 and the synthetic formation water as described in Example 5. (The synthetic formation water was a solution of sodium chloride (10.683 wt %), magnesium chloride hexahydrate (1.171 wt %), sodium sulfate (0.414%), and calcium chloride dihydrate (0.147 wt %) in deionized water (87.585 wt %).)

The synthetic seawater/synthetic formation water formulations are shown in TABLE 8:

TABLE 8

Three water formulations

| Water | Wt % synthetic seawater | Wt % synthetic formation water |
|---|---|---|
| SW | 100 | 0 |
| SW/FW | 50 | 50 |
| FW | 0 | 100 |

The synthetic waters shown in TABLE 8 were used in Example 7.

Example 7: Wettability of Oil-Saturated Rock Cores

Four formulations having 1000 ppm surfactant actives (lauryl betaine, alkoxylated alcohol, and internal olefin sulfonate) were made with components as shown in TABLE 9, by combining 1 part by weight of the concentrate A/4 (made as described in Example 1, formulation shown in TABLE 3) with 260.7 parts by weight of the synthetic water mixture having formulation shown in TABLE 8).

TABLE 9

Four injectate formulations

| Formulation | Concentrate | Water |
|---|---|---|
| F1 | A/4 | SW |
| F2 | A/4 | SW/FW |
| F3 | A/4 | FW |
| F4 | None | SW |

Figure 4:
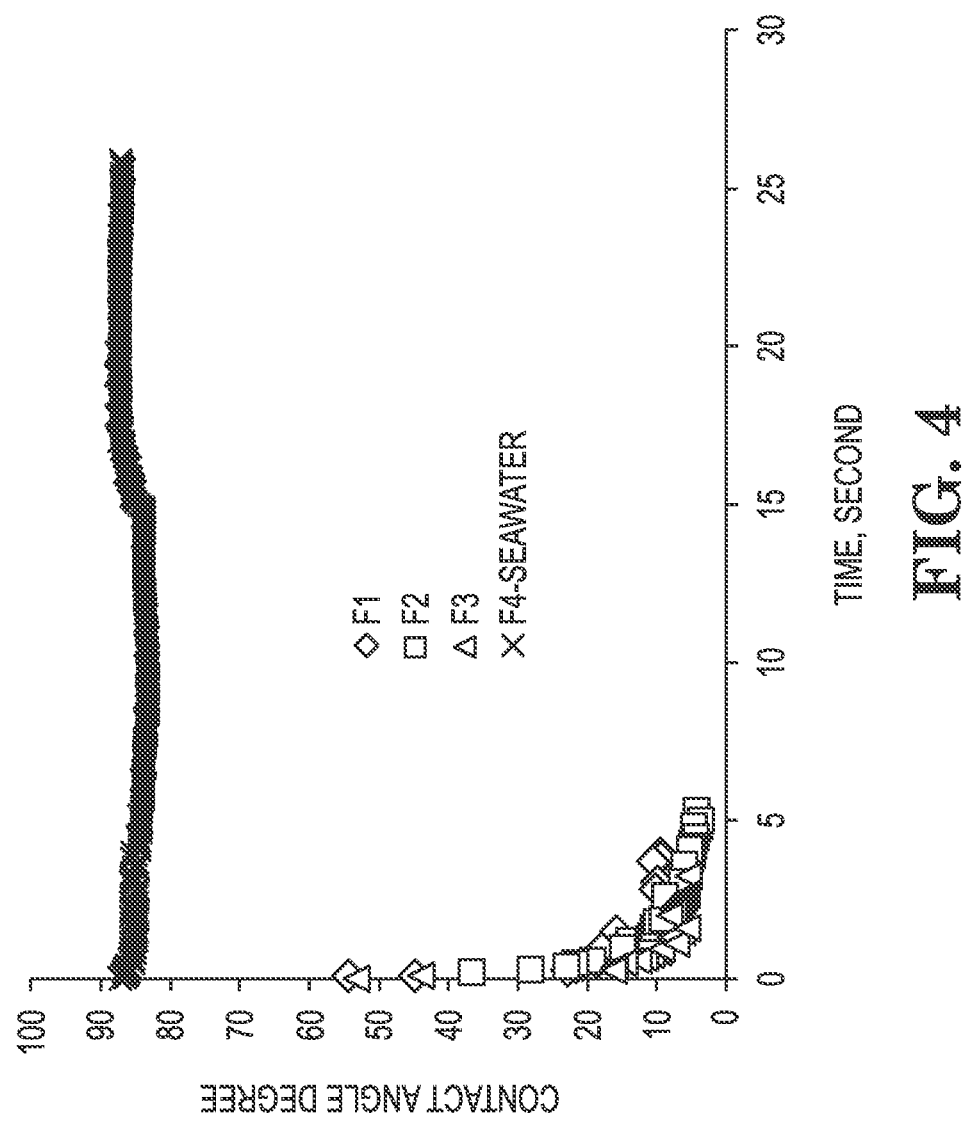
FIG. 4 is a plot of contact angle versus time for three injectates and seawater.

Commercial outcrop rock core samples were obtained from Kocurek Industries Inc. Oil-saturated rock core was prepared. The contact angle of each of the four formulations shown in TABLE 9 was measured over time using a RAMÉ-HART Model 295 goniometer. The results are plotted in FIG. 4. The results shown in FIG. 4 indicate that the A/4 concentrate, when combined with waters having a wide variety of salinities, is able to very quickly alter the wettability of a rock core surface from relatively oil-wet to water-wet.

Example 7: Static Adsorption Tests

The amount of adsorption of samples of F1, F2, and F3 (made as in Example 6) onto rock core was tested. The results are given in TABLE 10.

TABLE 10

Static adsorption tests

| Formulation | Supernatant/ppm | Adsorption/mg-g$^{-1}$ |
|---|---|---|
| F1 | 639 | 0.36 |
| F2 | 811 | 0.19 |
| F3 | 744 | 0.26 |

The results show that adsorption of the injectates into the rock core was acceptable.

Example 8: Spontaneous Imbibition of Oil

In the following spontaneous imbibition tests, three injectate compositions were used: synthetic seawater (prepared as in Example 2); and injectates A1 (no hydrotrope) and A4 (sodium xylene sulfonate hydrotrope), both prepared as in Example 3 and shown in TABLE 5.

Three rock cores, core (i), core (ii), and core (iii) (available from Kocurek Industries, Inc.) were cleaned by solvent extraction by soaking in a methanol/toluene mixture (1:2 ratio) overnight and then solvent extraction with the same solvent composition in a Soxhlet extractor for about five hours. Each core was dried at 115° C. for two hours. Each clean core was weighed and marked for identification.

Each core was saturated with a heavy crude oil blended with 35% cyclohexane by pressurizing the core in an OFITE® high-pressure high-temperature cell available from OFI Testing Equipment, Inc. at 110° C. at a pressure of 700 psi for six days.

Each of the three oil-saturated cores was weighed to determine the amount of oil taken up by each core.

Figure 5:
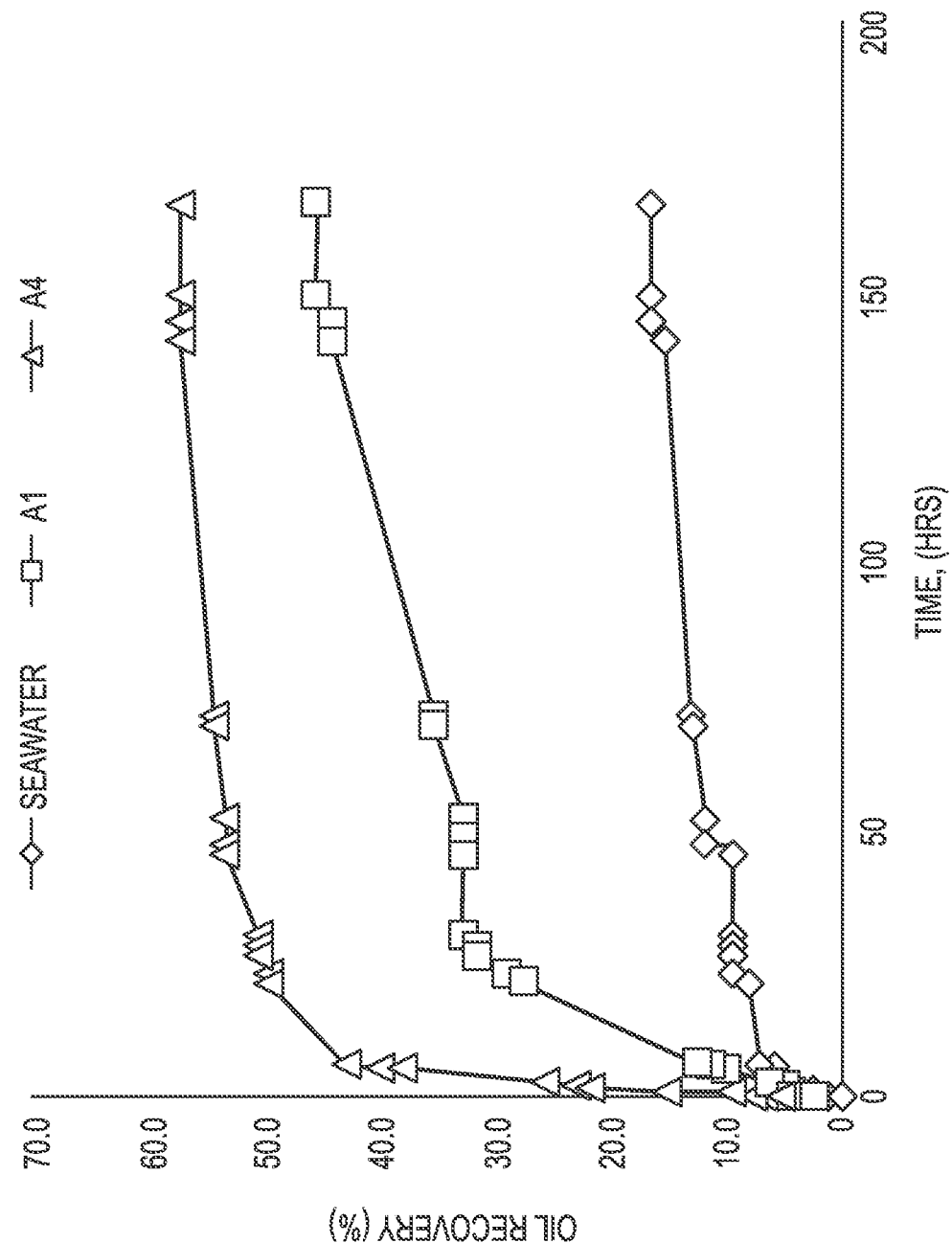
FIG. 5 is a lot of oil recovery versus time measured as described in Example 8.

Each of the three oil-saturated cores was placed in a separate glass cell. One of the glass cells was filled with synthetic seawater, a second of the cells with injectate A4 (SXS hydrotrope), and the third of the cells with injectate A1 (no hydrotrope). The cells were heated to 110° C. and the amount of oil coming out of each core as a percentage of the oil taken up (imbibed) by that core was monitored until no further oil was exiting any of the cores (approximately 175 hours). The results are shown in FIG. 5. The plot in FIG. 5 shows that amount and rate of oil recovery from the cores was markedly higher for injectate A4 containing the sodium xylene sulfonate hydrotrope than for the corresponding formulation without the hydrotrope (A1), and much higher than that for seawater.

What we claim is:

1. A concentrate for enhanced oil recovery, the concentrate comprising:
    (i) a sulfonated or sulfated surfactant;
    (ii) an alkoxylated alcohol surfactant;
    (iii) a coupling agent;
    (iv) a hydrotrope;
    (v) an additional surfactant selected from an anionic surfactant, a cationic surfactant, a nonionic surfactant, a zwitterionic surfactant, or any combination thereof; and
    (vi) water,
    wherein the hydrotrope comprises an aryl phosphate, an alkaryl phosphate, an arylalkyl phosphate, or any combination thereof.

2. The concentrate of claim 1, wherein the hydrotrope is the aryl phosphate.

3. The concentrate of claim 1, wherein the alkoxylated alcohol surfactant has a formula $R^1—O—(R^2O)m-(CH_2)—CO_2X$,
    wherein $R^1$ is a C10 to C20 alkyl group,
    $R^2$ is a C1 to C4 alkylene group,
    m is 1 to 10, and
    X is hydrogen or an alkali metal ion.

4. The concentrate of claim 3, wherein $R^1$ is tridecyl, $R^2$ is $—CH_2CH_2—$, and m is 3.

5. The concentrate of claim 1, wherein the sulfonated or sulfated surfactant is a C15 to C18 internal olefin sulfonate.

6. The concentrate of claim 1, wherein the hydrotrope is potassium toluene phosphate.

7. The concentrate of claim 6, comprising about 1 gram to about 7 grams of potassium toluene phosphate per 100 grams of the concentrate.

8. The concentrate of claim 1, wherein a molar ratio of the coupling agent to the hydrotrope is about 2.6 to about 9.5.

9. The concentrate of claim 1, wherein the additional surfactant is selected from betaines, sultaines, alkyl amine oxides, alkyl amphoacetates, alkylamphopropionates, alkyliminodipropionate, or any combination thereof.

10. The concentrate of claim 1, wherein the additional surfactant is lauryl betaine.

11. The concentrate of claim 1, wherein the coupling agent is ethylene glycol monobutyl ether.

12. The concentrate of claim 1, comprising 5 wt % to 15 wt % of the sulfonated or sulfated surfactant, 1 wt % to 5 wt % of the alkoxylated alcohol surfactant, 5 wt % to 15 wt % of the additional surfactant, and 5 wt % to 15 wt % of the coupling agent based on a total weight of the concentrate.

13. The concentrate of claim 1, wherein a weight ratio of the hydrotrope to total surfactant in the concentrate is about 0.1:1 to about 0.2:1.

14. The concentrate of claim 1, comprising 50 wt % to 70 wt % water based on a total weight of the concentrate.

15. The concentrate of claim 1, wherein the hydrotrope comprises one or more compounds having a structure:

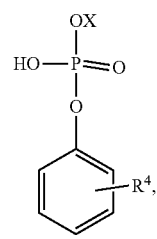

wherein X is H or an alkali metal and $R^4$ is a C1-C6 alkyl;

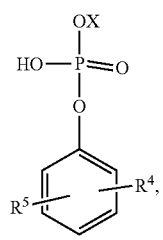

wherein X is hydrogen or alkali metal, and $R^4$ and $R^5$ are independently selected from C1 to C3 alkyl;

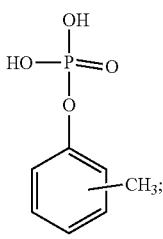

or any combination thereof.

16. An injectate composition comprising the concentrate of claim 1 and a water source selected from seawater, produced water, tap water, distilled water, deionized water, brine, or any combination thereof.

17. The injectate composition of claim 16, wherein a total concentration of surfactant in the injectate composition is 1.06 to 1.18 wt % of the injectate composition.

18. The injectate composition of claim 16, wherein a turbidity of the injectate composition is 300 to 800 NTU and an interfacial tension of the injectate composition is 0.0065 to 0.03 mN/m.

19. The injectate composition of claim 16, comprising 3 wt % to 5 wt % salts based on a total weight of the injectate composition.

20. A method of enhanced oil recovery, the method comprising:
    (a) introducing the injectate of claim 16 into a subterranean oil formation; and
    (b) recovering a hydrocarbon from the subterranean oil formation.

* * * * *